US012707509B2

(12) United States Patent
Schreiber et al.

(10) Patent No.: US 12,707,509 B2
(45) Date of Patent: Aug. 11, 2026

(54) DETERMINING RANDOM-ACCESS CHANNEL TRANSMISSION OCCASIONS

(71) Applicant: Nokia Technologies Oy, Espoo (FI)

(72) Inventors: Gerhard Schreiber, Stuttgart (DE); Anna Pantelidou, Massy (FR)

(73) Assignee: Nokia Technologies Oy, Espoo (FI)

( * ) Notice: Subject to any disclaimer, the term of this patent is extended or adjusted under 35 U.S.C. 154(b) by 302 days.

(21) Appl. No.: 18/565,666

(22) PCT Filed: Jun. 28, 2021

(86) PCT No.: PCT/EP2021/067672
§ 371 (c)(1),
(2) Date: Nov. 30, 2023

(87) PCT Pub. No.: WO2023/274494
PCT Pub. Date: Jan. 5, 2023

(65) Prior Publication Data
US 2025/0071828 A1 Feb. 27, 2025

(51) Int. Cl.
*H04W 74/0833* (2024.01)
*H04W 72/0446* (2023.01)
(Continued)

(52) U.S. Cl.
CPC ..... *H04W 74/085* (2013.01); *H04W 72/0446* (2013.01); *H04W 74/0833* (2013.01);
(Continued)

(58) Field of Classification Search
CPC ........... H04W 74/085; H04W 72/0446; H04W 74/0833; H04W 74/0836; H04W 74/0838;
(Continued)

(56) References Cited

U.S. PATENT DOCUMENTS

2020/0305128 A1 9/2020 Abedini et al.
2021/0029738 A1 1/2021 Zhou et al.
2022/0322445 A1* 10/2022 Kaikkonen ....... H04W 74/0833

FOREIGN PATENT DOCUMENTS

WO 2020/060463 A1 3/2020
WO 2020/159286 A1 8/2020
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

(Continued)

*Primary Examiner* — Omar J Ghowrwal
(74) *Attorney, Agent, or Firm* — Barta Jones, PLLC

(57) ABSTRACT

Disclosed is a method comprising obtaining at least one of: random-access channel information associated with at least one terminal device, load measurement information on a first set of candidate random-access channel transmission occasions, and interference measurement information on the first set of candidate random-access channel transmission occasions; determining, from the first set of candidate random-access channel transmission occasions, a set of random-access channel transmission occasions within a physical random-access channel slot based at least partly on the at least one of the random-access channel information, the load measurement information, and the interference measurement information; and indicating, to one or more first network nodes, at least one subset of the set of random-access channel transmission occasions.

18 Claims, 22 Drawing Sheets

(51) Int. Cl.
*H04W 74/00* (2009.01)
*H04W 74/0836* (2024.01)
*H04W 74/0838* (2024.01)

(52) U.S. Cl.
CPC ........ *H04W 74/002* (2013.01); *H04W 74/004* (2013.01); *H04W 74/006* (2013.01); *H04W 74/0836* (2024.01); *H04W 74/0838* (2024.01)

(58) Field of Classification Search
CPC ............. H04W 74/002; H04W 74/004; H04W 74/006
See application file for complete search history.

(56) References Cited

FOREIGN PATENT DOCUMENTS

| | | | |
|---|---|---|---|
| WO | 2020/234507 | A1 | 11/2020 |
| WO | 2021/034246 | A1 | 2/2021 |
| WO | 2021/066703 | A1 | 4/2021 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; Physical layer procedures for control (Release 16)", 3GPP TS 38.213, V16.5.0, Mar. 2021, pp. 1-183.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NG-RAN; Xn application protocol (XnAP) (Release 16)", 3GPP TS 38.423, V16.4.0, Jan. 2021, pp. 1-457.

"3rd Generation Partnership Project; Technical Specification Group Radio Access Network; NR; Physical channels and modulation (Release 16)", 3GPP TS 38.211, V16.5.0, Mar. 2021, pp. 1-134.

"Msc-generator", Sourceforge, Retrieved on Dec. 11, 2023, Webpage available at : https://sourceforge.net/projects/msc-generator/.

"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.

"CB: # 45_Email045-IAB_PHYlayer_param_F1AP", 3GPP TSG-RAN WG3 Meeting #107-e, R3-20xxxx, Agenda item: 13.2.1.4, Qualcomm Incorporated, Feb. 24-Mar. 6, 2020, 62 pages.

International Search Report and Written Opinion received for corresponding Patent Cooperation Treaty Application No. PCT/EP2021/067672, dated Apr. 5, 2022, 13 pages.

"RACH-based UL small data transmission procedure", 3GPP RAN WG2 Meeting #111-e, R2-2007613, Agenda Item: 8.6.2, InterDigital, Aug. 17- 28, 2020, pp. 1-3.

* cited by examiner

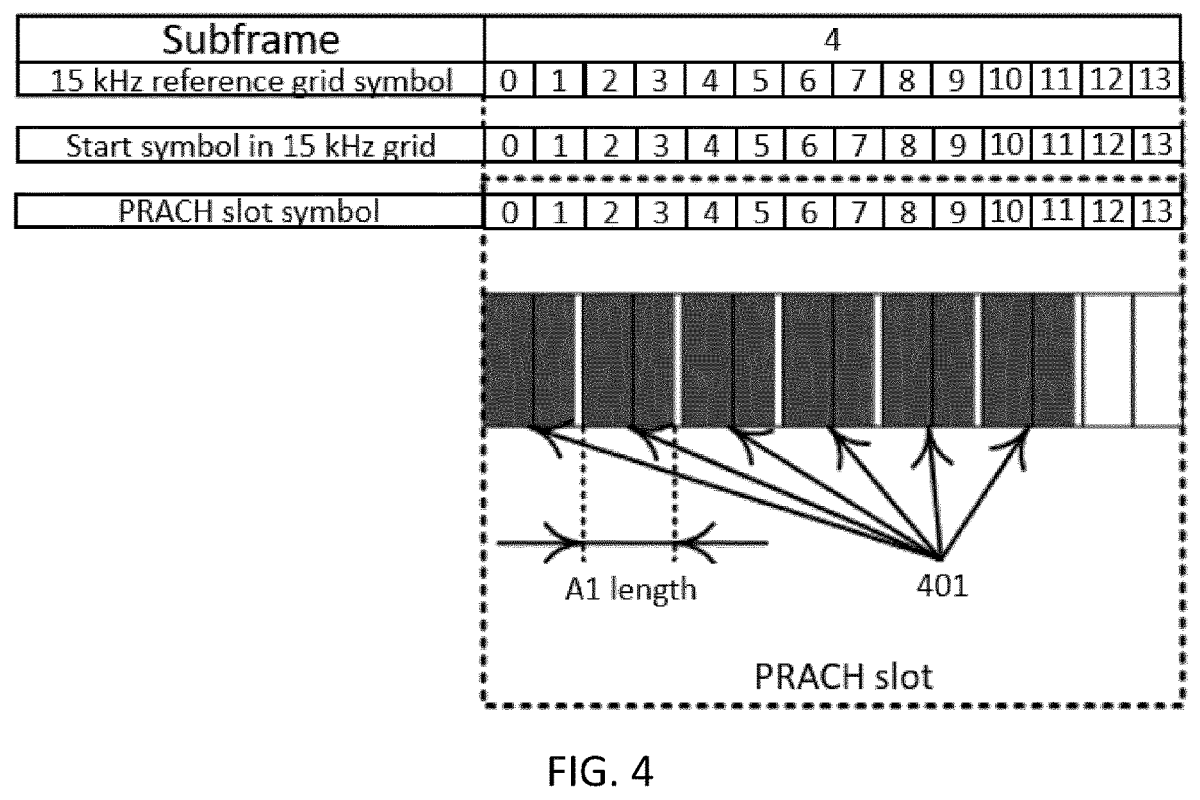

| Subframe | 4 | | | | | | | | | | | | | |
|---|---|---|---|---|---|---|---|---|---|---|---|---|---|---|
| 15 kHz reference grid symbol | 0 | 1 | 2 | 3 | 4 | 5 | 6 | 7 | 8 | 9 | 10 | 11 | 12 | 13 |
| Start symbol in 15 kHz grid | 0 | 1 | 2 | 3 | 4 | 5 | 6 | 7 | 8 | 9 | 10 | 11 | 12 | 13 |
| PRACH slot symbol | 0 | 1 | 2 | 3 | 4 | 5 | 6 | 7 | 8 | 9 | 10 | 11 | 12 | 13 |

A1 length

401

PRACH slot

FIG. 4

DETERMINING RANDOM-ACCESS CHANNEL TRANSMISSION OCCASIONS

RELATED APPLICATION

This application was originally filed as PCT Application No. PCT/EP2021/067672, filed on Jun. 28, 2021, which is incorporated herein by reference in its entirety.

FIELD

The following exemplary embodiments relate to wireless communication.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: obtain at least one of: random-access channel information associated with at least one terminal device, load measurement information on a first set of candidate random-access channel transmission occasions, and interference measurement information on the first set of candidate random-access channel transmission occasions; determine, from the first set of candidate random-access channel transmission occasions, a set of random-access channel transmission occasions within a physical random-access channel slot based at least partly on the at least one of the random-access channel information, the load measurement information, and the interference measurement information; and indicate, to one or more first network nodes, at least one subset of the set of random-access channel transmission occasions.

According to another aspect, there is provided an apparatus comprising means for: obtaining at least one of: random-access channel information associated with at least one terminal device, load measurement information on a first set of candidate random-access channel transmission occasions, and interference measurement information on the first set of candidate random-access channel transmission occasions; determining, from the first set of candidate random-access channel transmission occasions, a set of random-access channel transmission occasions within a physical random-access channel slot based at least partly on the at least one of the random-access channel information, the load measurement information, and the interference measurement information; and indicating, to one or more first network nodes, at least one subset of the set of random-access channel transmission occasions.

According to another aspect, there is provided a method comprising: obtaining at least one of: random-access channel information associated with at least one terminal device, load measurement information on a first set of candidate random-access channel transmission occasions, and interference measurement information on the first set of candidate random-access channel transmission occasions; determining, from the first set of candidate random-access channel transmission occasions, a set of random-access channel transmission occasions within a physical random-access channel slot based at least partly on the at least one of the random-access channel information, the load measurement information, and the interference measurement information; and indicating, to one or more first network nodes, at least one subset of the set of random-access channel transmission occasions.

According to another aspect, there is provided a computer program comprising instructions for causing an apparatus to perform at least the following: obtaining at least one of: random-access channel information associated with at least one terminal device, load measurement information on a first set of candidate random-access channel transmission occasions, and interference measurement information on the first set of candidate random-access channel transmission occasions; determining, from the first set of candidate random-access channel transmission occasions, a set of random-access channel transmission occasions within a physical random-access channel slot based at least partly on the at least one of the random-access channel information, the load measurement information, and the interference measurement information; and indicating, to one or more first network nodes, at least one subset of the set of random-access channel transmission occasions.

According to another aspect, there is provided a computer program product comprising program instructions which, when run on a computing apparatus, cause the computing apparatus to perform at least the following: obtaining at least one of: random-access channel information associated with at least one terminal device, load measurement information on a first set of candidate random-access channel transmission occasions, and interference measurement information on the first set of candidate random-access channel transmission occasions; determining, from the first set of candidate random-access channel transmission occasions, a set of random-access channel transmission occasions within a physical random-access channel slot based at least partly on the at least one of the random-access channel information, the load measurement information, and the interference measurement information; and indicating, to one or more first network nodes, at least one subset of the set of random-access channel transmission occasions.

According to another aspect, there is provided a computer readable medium comprising program instructions for causing an apparatus to perform at least the following: obtaining at least one of: random-access channel information associated with at least one terminal device, load measurement information on a first set of candidate random-access channel transmission occasions, and interference measurement information on the first set of candidate random-access channel transmission occasions; determining, from the first set of candidate random-access channel transmission occasions, a set of random-access channel transmission occasions within a physical random-access channel slot based at least partly on the at least one of the random-access channel information, the load measurement information, and the interference measurement information; and indicating, to one or more first network nodes, at least one subset of the set of random-access channel transmission occasions.

According to another aspect, there is provided a non-transitory computer readable medium comprising program instructions for causing an apparatus to perform at least the following: obtain at least one of: obtain at least one of: random-access channel information associated with at least one terminal device, load measurement information on a first set of candidate random-access channel transmission occasions, and interference measurement information on the first set of candidate random-access channel transmission occasions; determine, from the first set of candidate random-access channel transmission occasions, a set of random-access channel transmission occasions within a physical random-access channel slot based at least partly on the at least one of the random-access channel information, the load measurement information, and the interference measurement information; and indicate, to one or more first network nodes, at least one subset of the set of random-access channel transmission occasions.

According to another aspect, there is provided an apparatus comprising at least one processor, and at least one memory including computer program code, wherein the at least one memory and the computer program code are configured, with the at least one processor, to cause the apparatus to: transmit random-access channel information indicating at least one or more random-access channel transmission occasions utilized by the apparatus for one or more random-access preamble transmissions; receive a message indicating a set of random-access channel transmission occasions within a physical random-access channel slot; and transmit a random-access preamble on at least one random-access channel transmission occasion indicated by the set of random-access channel transmission occasions.

According to another aspect, there is provided an apparatus comprising means for: transmitting random-access channel information indicating at least one or more random-access channel transmission occasions utilized by the apparatus for one or more random-access preamble transmissions; receiving a message indicating a set of random-access channel transmission occasions within a physical random-access channel slot; and transmitting a random-access preamble on at least one random-access channel transmission occasion indicated by the set of random-access channel transmission occasions.

According to another aspect, there is provided a method comprising: transmitting, by a terminal device, random-access channel information indicating at least one or more random-access channel transmission occasions utilized by the terminal device for one or more random-access preamble transmissions; receiving, by the terminal device, a message indicating a set of random-access channel transmission occasions within a physical random-access channel slot; and transmitting, by the terminal device, a random-access preamble on at least one random-access channel transmission occasion indicated by the set of random-access channel transmission occasions.

According to another aspect, there is provided a computer program comprising instructions for causing an apparatus to perform at least the following: transmitting random-access channel information indicating at least one or more random-access channel transmission occasions utilized by the apparatus for one or more random-access preamble transmissions; receiving a message indicating a set of random-access channel transmission occasions within a physical random-access channel slot; and transmitting a random-access preamble on at least one random-access channel transmission occasion indicated by the set of random-access channel transmission occasions.

According to another aspect, there is provided a computer program product comprising program instructions which, when run on a computing apparatus, cause the computing apparatus to perform at least the following: transmitting random-access channel information indicating at least one or more random-access channel transmission occasions utilized by the computing apparatus for one or more random-access preamble transmissions; receiving a message indicating a set of random-access channel transmission occasions within a physical random-access channel slot; and transmitting a random-access preamble on at least one random-access channel transmission occasion indicated by the set of random-access channel transmission occasions.

According to another aspect, there is provided a computer readable medium comprising program instructions for causing an apparatus to perform at least the following: transmitting random-access channel information indicating at least one or more random-access channel transmission occasions utilized by the apparatus for one or more random-access preamble transmissions; receiving a message indicating a set of random-access channel transmission occasions within a physical random-access channel slot; and transmitting a random-access preamble on at least one random-access channel transmission occasion indicated by the set of random-access channel transmission occasions.

According to another aspect, there is provided a non-transitory computer readable medium comprising program instructions for causing an apparatus to perform at least the following: transmitting random-access channel information indicating at least one or more random-access channel transmission occasions utilized by the apparatus for one or more random-access preamble transmissions; receiving a message indicating a set of random-access channel transmission occasions within a physical random-access channel slot; and transmitting a random-access preamble on at least one random-access channel transmission occasion indicated by the set of random-access channel transmission occasions.

According to another aspect, there is provided a system comprising at least at least a first apparatus and a second apparatus. The first apparatus may be, for example, a terminal device, a base station, a central unit, or a control center. The second apparatus may be, for example, a base station, a distributed unit, a central unit, or a control center. The second apparatus is configured to: obtain at least one of: random-access channel information associated with at least one terminal device, load measurement information on a first set of candidate random-access channel transmission occasions, and interference measurement information on the first set of candidate random-access channel transmission occasions; determine, from the first set of candidate random-access channel transmission occasions, a set of random-access channel transmission occasions within a physical random-access channel slot based at least partly on the at least one of the random-access channel information, the load measurement information, and the interference measurement information; and indicate, to the first apparatus, at least one subset of the set of random-access channel transmission occasions. The first apparatus is configured to: receive, from the second apparatus, the at least one subset of the set of random-access channel transmission occasions.

According to another aspect, there is provided a system comprising at least a first apparatus and a second apparatus. The first apparatus may be, for example, a terminal device, a base station, a central unit, or a control center. The second apparatus may be, for example, a base station, a distributed unit, a central unit, or a control center. The second apparatus comprises means for: obtaining at least one of: random-access channel information associated with at least one terminal device, load measurement information on a first set of candidate random-access channel transmission occasions, and interference measurement information on the first set of candidate random-access channel transmission occasions; determining, from the first set of candidate random-access channel transmission occasions, a set of random-access channel transmission occasions within a physical random-access channel slot based at least partly on the at least one of the random-access channel information, the load measurement information, and the interference measurement information; and indicating, to the first apparatus, at least one subset of the set of random-access channel transmission occasions. The first apparatus comprises means for: receiving, from the second apparatus, the at least one subset of the set of random-access channel transmission occasions.

BRIEF DESCRIPTION OF THE DRAWINGS

In the following, various exemplary embodiments will be described in greater detail with reference to the accompanying drawings, in which

FIGS. 3-5 illustrate example allocations of physical random-access channel transmission occasions;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi®), worldwide interoperability for microwave access (WiMAX®), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
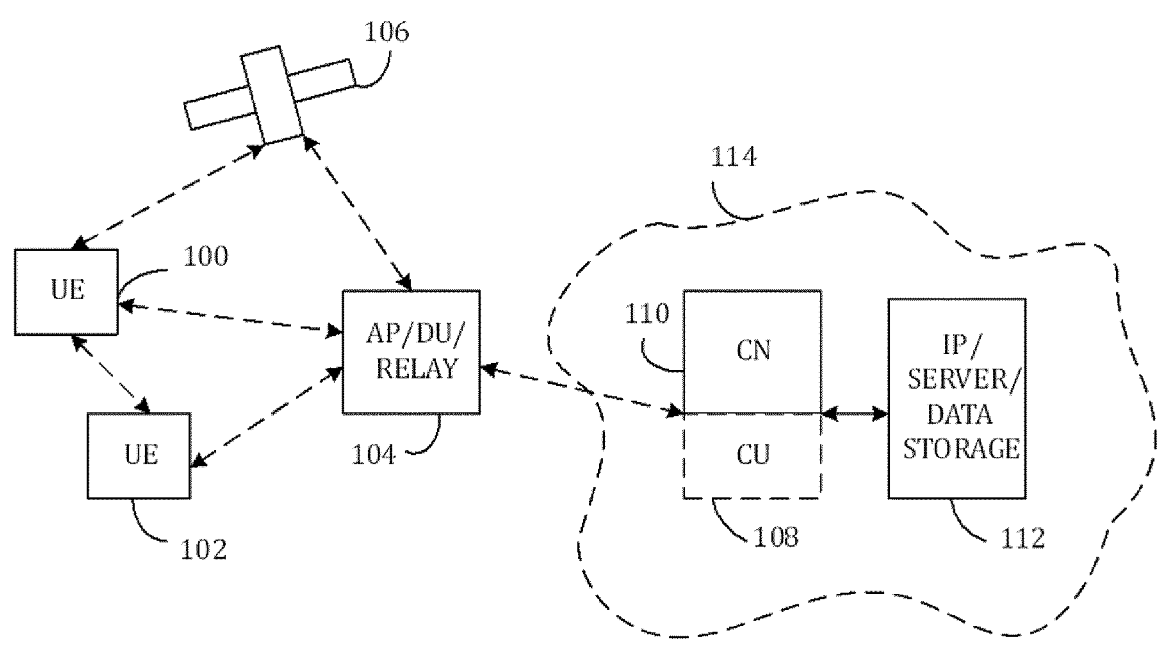
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud-RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Figure 2:
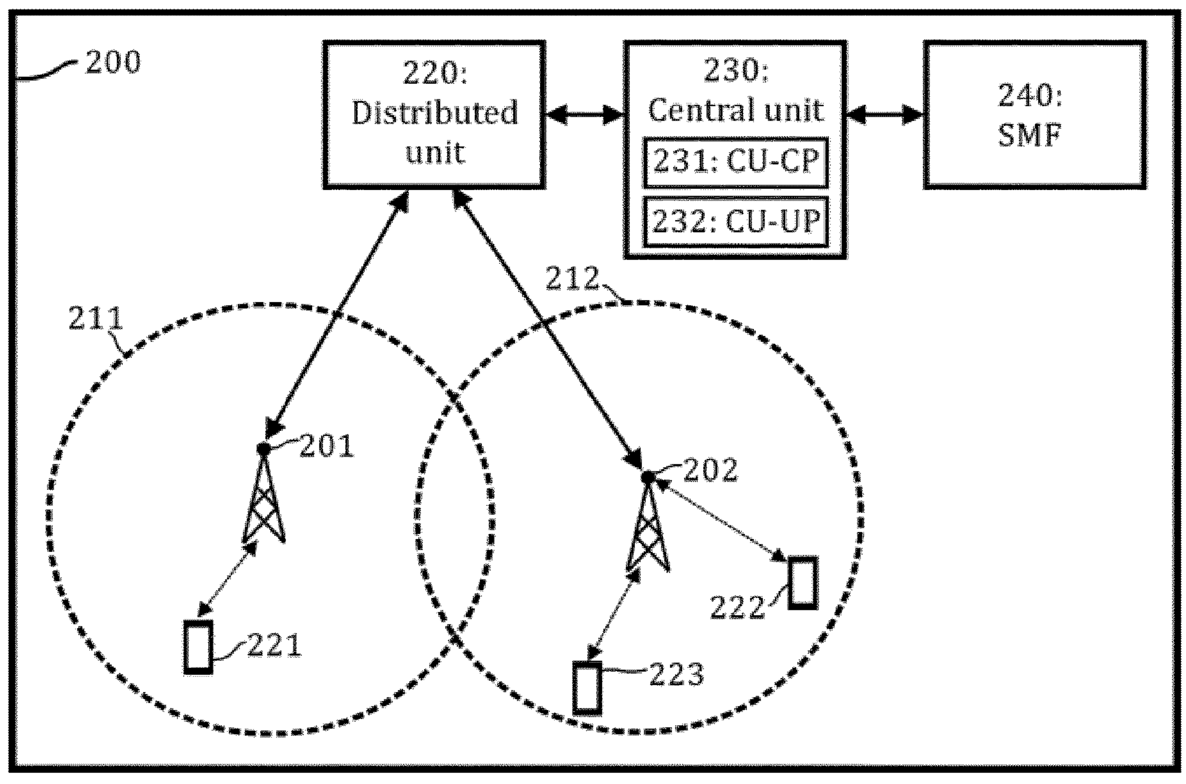
FIG. 2 illustrates an example of a communication system with a split base station architecture.

FIG. 2 illustrates another example of a communication system 200 with a split base station architecture, to which some exemplary embodiments may be applied. The illustrated communications system employs a disaggregated RAN architecture, where the RAN functionalities are distributed between different distinct units forming the RAN. The communications system 200 may correspond to the communication system as discussed in relation to FIG. 1, or a part thereof. Therefore, any of the UEs 221, 222, 223 may correspond to either of elements 100, 102 of FIG. 1. Moreover, the access node 104 of FIG. 1 may correspond to a combination of the elements 201, 202, 220 forming a distributed access node. The illustrated communications system may be based on NR access technology.

Referring to FIG. 2, the communication system 200 comprises two (remote) radio units or radio heads 201, 202 providing respective (neighboring) cells 211, 212, a distributed unit 220 connected to at least one of the remote radio units 201, 202 via wired and/or wireless communications links, and a central unit 230 connected to the distributed unit 220 via a wired or wireless communications link. The central unit 230 may be further connected via wired and/or wireless communications link at least to a session management function (SMF). This connection may be provided via one or more other functions or network entities not shown in FIG. 2 (e.g., via a user plane function, UPF, and/or an access management function, AMF).

At least one of the elements 201, 202, 220, 230 may be associated with the same access node (e.g., the same gNB). At least one remote radio unit 201, 202 may be MIMO-capable (i.e., comprise a MIMO antenna array and associated signal processing means for performing beamforming using said MIMO antenna array). Moreover, the communication system 200 comprises a plurality of UEs 221, 222, 223 located within said cells 211, 212. In other exemplary embodiments, the number of the remote radio units may be different compared to the illustrated example. While FIG. 2 illustrates a single distributed unit 220 for simplicity, in other exemplary embodiments two or more distributed units 220 connected to the same central unit 230 may be provided.

The distributed unit 220 may be used for the so-called Layer 1 (L1) processing and real-time Layer 2 (L2) processing. The central unit 230 may be used for non-real-time L2 and Layer 3 (L3) processing. The central unit 230 may host higher layer protocols, such as radio resource control (RRC), service data adaptation protocol (SDAP) and/or packet data convergence protocol (PDCP), of the base station. The distributed unit 220 may host the radio link control (RLC), medium access control (MAC) and/or physical (PHY) layers of the base station. The operation of the distributed unit 220 may be at least partly controlled by the central unit 230.

The central unit 230 may comprise two separate units (or sub-units, logical nodes or entities): a control plane entity of the central unit (central unit-control plane, CU-CP) 231 and a user plane entity of the central unit (central unit-user plane, CU-UP) 232. The CU-CP 231 may, for example, host the RRC and the control plane part of the PDCP protocol of the CU 230, while the CU-UP 232 may host the user plane part of the PDCP protocol and the SDAP protocol of the CU 230. The interface between the distributed unit 220 and the central unit 230 may be called an F1 interface. Specifically, the interface between the DU 220 and the CP-CU 231 may be called F1-C interface, and the interface between the DU 220 and the CU-UP may be called a F1-U interface. The interface between the CU-CP and the CU-UP may be called an E1 interface.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

A UE may perform a random-access procedure to access a network. The purpose of performing the random-access procedure may be, for example, initial access, handover, scheduling request, or timing synchronization. The random-access procedure may be classified as a contention-based random-access procedure (CBRA) or a contention-free random-access procedure (CFRA). CFRA may also be referred to as non-contention based random access.

The random-access procedure may start by the UE sending a random-access preamble to a base station via the physical random-access channel (PRACH) in order to obtain uplink synchronization. In CFRA, a given UE has a dedicated random-access preamble allocated by the base station, whereas in CBRA the UE selects the preamble randomly from a pool of preambles shared with other UEs in the cell. In CBRA, the contention (or collision) may occur, if two or more UEs attempt the random-access procedure by using the same random-access procedure on the same resource.

Within a random-access procedure, the preamble transmission may take place in network-configured random-access occasions, which may also be referred to as PRACH transmission occasions. Several consecutive PRACH transmission occasions in the time and frequency domain may be configured within one PRACH slot. If N is the number of PRACH occasions in time within a slot, and F is the number of frequency-multiplexed occasions, then one PRACH slot covers F*N PRACH occasions. The network may configure a time-periodic pattern of PRACH slots. The total number of PRACH occasions within a PRACH configuration period is then F*N*S, where S denotes the number of PRACH slots per configuration period. For example, the number of frequency-multiplexed PRACH slots may range from 1 up to 8. The PRACH configuration periodicity may range from 10 to 160 ms, for example. The number of PRACH slots per configuration period may depend on the PRACH configuration index as specified by standards like 3GPP for 5G NR.

Table 1 below shows how the PRACH transmission occasions may be defined for PRACH configuration index 98, as an example. It should be noted that other configuration indices may also be used. The selected example index is one out of 256 different configurations defined for frequency range 1 (FR1) and paired spectrum/supplementary uplink. The second column in Table 1 provides information on the format, i.e. A1, defined for this configuration index. The third column in Table 1 defines the system frame numbers (SFNs) with PRACH transmission occasions. In this example, PRACH preamble transmissions are allowed on any frame. In this example, one frame has a duration of 10 ms, which means that the PRACH configuration period is 10 ms. The fourth column defines the reference slots/subframes within a radio frame with PRACH occasions (note: the reference slot/subframe grid for FR1/FR2 is based on 15/60 kHz subcarrier spacing). The fifth column defines the starting symbol parameter for calculation of the PRACH transmission symbols. The last three columns provide information on the number of PRACH slots within a reference slot/subframe, the number $$(N_t^{RA,slot})$$

of PRACH occasions within a PRACH slot, and the duration $$(N_{dur}^{RA})$$

in number of PRACH symbols.

TABLE 1

| PRACH configuration index | Preamble format | $n_{SFN}$ mod x = y: x | y | Subframe number | Starting symbol | Number of PRACH slots within a subframe | $N_t^{RA,slot}$ | $N_{dur}^{RA}$ |
|---|---|---|---|---|---|---|---|---|
| 98 | A1 | 1 | 0 | 4 | 0 | 1 | 6 | 2 |

As an example, Table 2 provides details for format A1 for baseband signal generation in case of sequence length 139, and 15 kHz subcarrier spacing. The format has two sequence repetitions and cyclic prefix. In this example, the duration of the total preamble is 142.708 μs=(2*2048+288)*Ts, where 1 Ts=1/30.72e6 seconds. The guard duration is given by the time difference between the end of the preamble and the start of the next preamble symbol. $L_{RA}$ is the sequence length. $\Delta f^{RA}$ is the subcarrier spacing for the PRACH preamble.

$$N_{CP}^{RA}$$

is the cyclic prefix length. $N_u$ denotes added unit.

TABLE 2

| Format | $L_{RA}$ | $\Delta f^{RA}$ | $N_u$ [Ts] | $N_{CP}^{RA}$ [Ts] |
|---|---|---|---|---|
| A1 | 139 | 15 kHz | 2 · 2048 | 288 |

Figure 3:
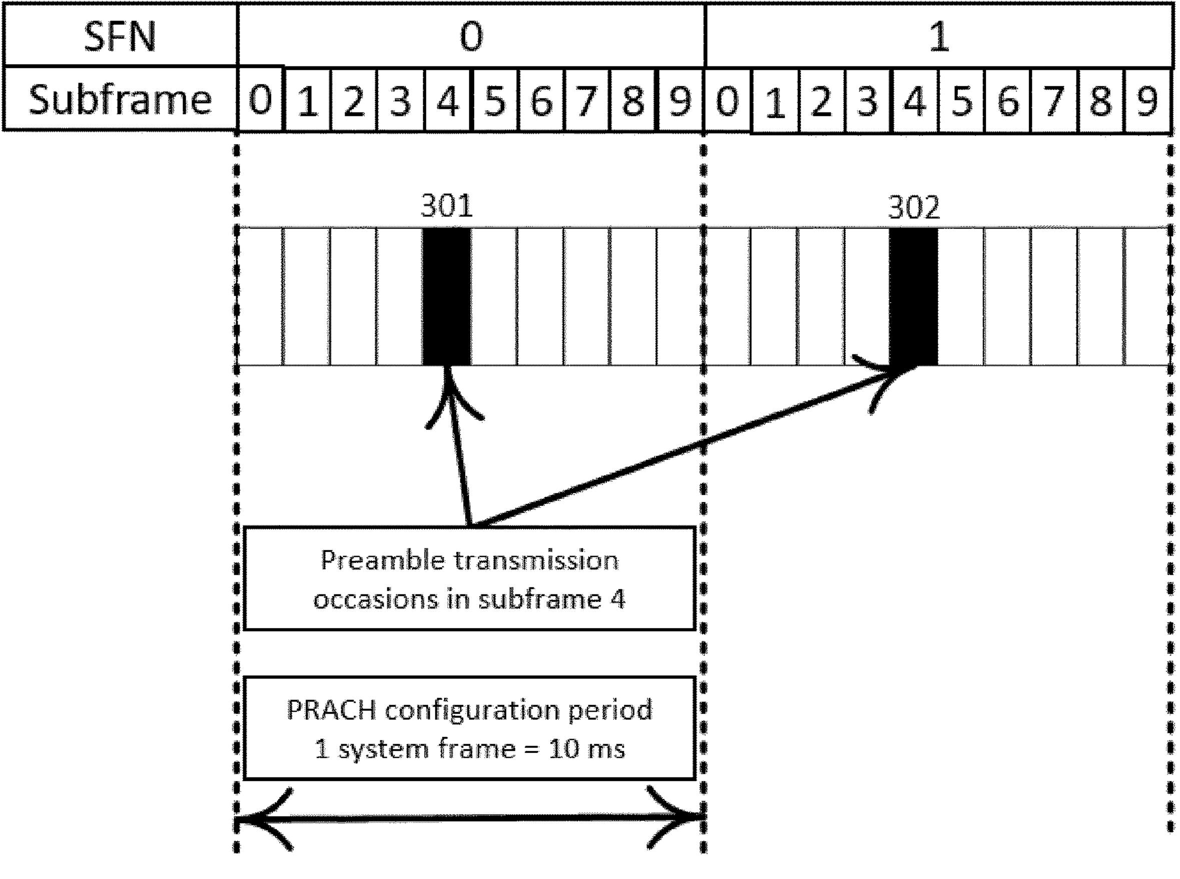

FIG. 3 illustrates, as an example, the subframes 301, 302 within a radio frame with PRACH slots for PRACH configuration 98. The subframes 301, 302 indicate the time-domain occasions, when a UE is allowed to transmit PRACH preambles in uplink direction. In this example, the allowed slots occur in all systems frames at subframe 4. In this example, the radio frame periodicity is 10 ms, and the length of one subframe is 1 ms. The PRACH preamble may be smaller than the subframe in the time domain.

Using the information on the start symbol and the number of occasions within a PRACH slot, it is possible to determine the start symbol for PRACH preamble transmission occasions within the PRACH slot. For example, six start symbols for a 15 kHz PRACH grid may be determined as l={0,2,4,6,8,10}. In this example, there are six possible occasions within a 10 ms time frame, which correspond to 600 possible occasions per second. Assuming 64 contention-based and contention-free preambles configured per occasion, there are 38400 possible preamble transmissions per second in this example.

Figure 5:
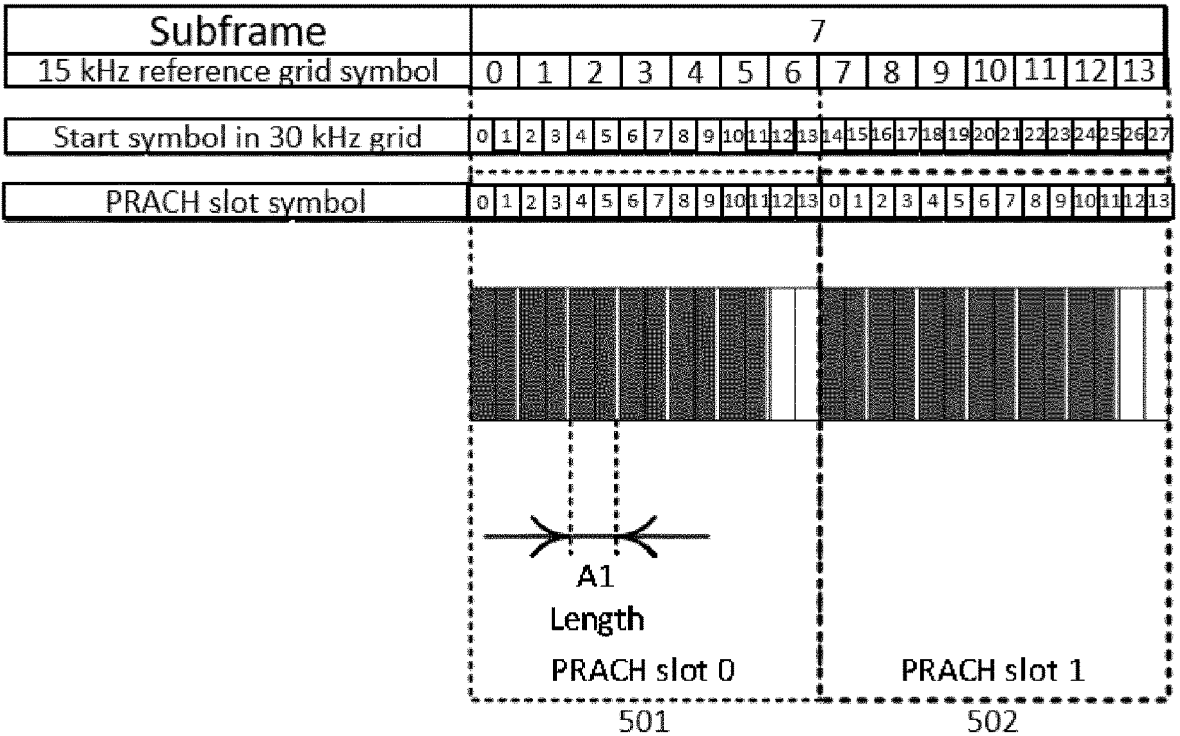

FIG. 4 illustrates, as an example, an allocation of PRACH transmission occasions 401 within a PRACH slot for subframe 4. In other words, FIG. 4 illustrates six preamble transmission occasions 401 for PRACH configuration index 98 within a PRACH slot for subframe 4, and with 15 kHz subcarrier spacing. In this example, the UE is allowed to transmit PRACH preambles in symbols 0, 2, 4, 6, 8 and 10. FIG. 5 illustrates, as an example, PRACH preamble transmission occasions for PRACH configuration 102 and 30 KHz PRACH subcarrier spacing. The configuration parameters of this example are shown in Table 3 below. A difference to configuration index 98 is that, in this example, there are two PRACH slots 501, 502 within a subframe, and 14 PRACH slot symbols within one slot. The preamble start symbols for a 30 kHz grid can be determined, for example, as l={0,2,4,6,8,10,14,16,18,20,22,24}. The preamble start symbols within a PRACH slot are l={0,2,4,6,8,10} in this case. In other words, in this example, there are six PRACH transmission occasions within a PRACH slot. The UE may randomly select one of the six PRACH preamble transmission occasions for transmitting a PRACH preamble.

TABLE 3

| PRACH configuration index | Preamble format | $n_{SFN}$ mod x = y: x | y | Subframe number | Starting symbol | Number of PRACH slots within a subframe | $N_t^{RA,slot}$ | $N_{dur}^{RA}$ |
|---|---|---|---|---|---|---|---|---|
| 102 | A1 | 1 | 0 | 7 | 0 | 2 | 6 | 2 |

Figure 6:
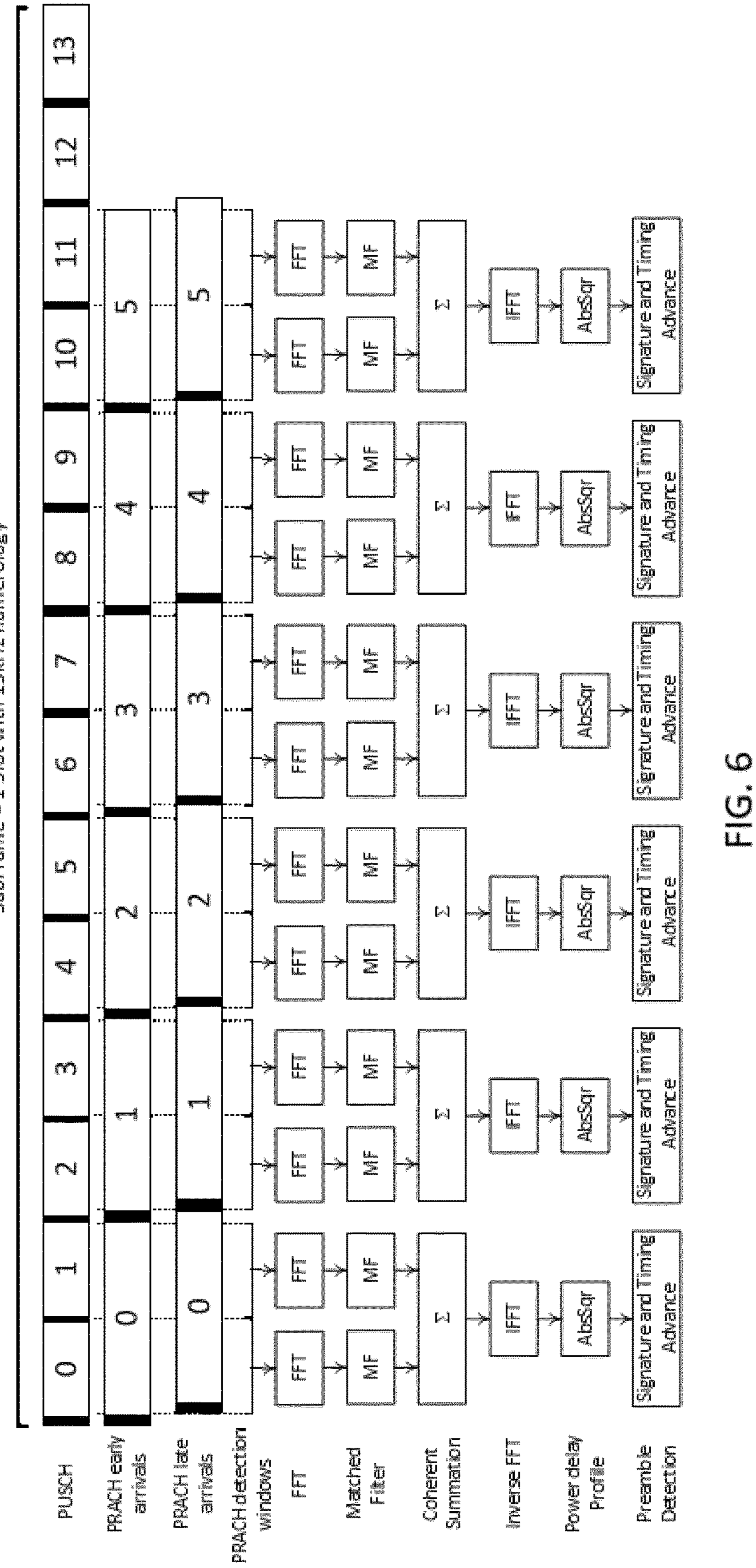
FIG. 6 illustrates an example of physical random-access channel occasion timing alignment relative to physical uplink shared channel timing.

FIG. 6 illustrates, as an example, a detailed view on the PRACH occasion timing alignment relative to uplink PUSCH timing for the example configuration 98, and 15 kHz subcarrier spacing. PRACH preambles from UEs very close to the receiver arrive early at the gNB receiver ("PRACH early arrivals"). On the other hand, UEs at the cell edge show late arrivals ("PRACH late arrivals"). The A1 format has a preamble cyclic prefix equal to 288*Ts (=9.375 us for 15 kHz subcarrier spacing) for preamble occasion 1, 2, 4 and 5, and thus the maximum supported cell radius is 703 m, assuming a delay spread of 144*Ts (=4.69 μs). A preamble guard is provided by the cyclic prefix of the next preamble occasion. The last preamble in a PRACH slot has its own guard with no transmissions. This can be observed from the timing of the PRACH detection windows prior to fast Fourier transform (FFT) processing. In FIG. 6, PUSCH refers to physical uplink shared channel, and AbsSqr denotes absolute square. It should be noted that the setup shown in FIG. 6 is just one example, and other implementations may also be used.

A problem associated with the current mechanism of defining PRACH transmission symbols is presented in the following, in the context of FR1 with paired spectrum and supplementary scenarios in uplink, and PRACH configuration indices intended for preamble format A1 transmission as shown in Table 4 below.

TABLE 4

| PRACH configuration index | Preamble format | $n_{SFN}$ mod x = y: x | y | Subframe number | Starting symbol | Number of PRACH slots within a subframe | $N_t^{RA,slot}$ | $N_{dur}^{RA}$ |
|---|---|---|---|---|---|---|---|---|
| 87 | A1 | 16 | 0 | 4, 9 | 0 | 1 | 6 | 2 |
| 88 | A1 | 16 | 1 | 4 | 0 | 2 | 6 | 2 |
| 89 | A1 | 8 | 0 | 4, 9 | 0 | 1 | 6 | 2 |
| 90 | A1 | 8 | 1 | 4 | 0 | 2 | 6 | 2 |
| 91 | A1 | 4 | 0 | 4, 9 | 0 | 1 | 6 | 2 |

TABLE 4-continued

| PRACH configuration index | Preamble format | $n_{SFN}$ mod x = x | y | Subframe number | Starting symbol | Number of PRACH slots within a subframe | $N_t^{RA,slot}$ | $N_{dur}^{RA}$ |
|---|---|---|---|---|---|---|---|---|
| 92 | A1 | 4 | 1 | 4, 9 | 0 | 1 | 6 | 2 |
| 93 | A1 | 4 | 0 | 4 | 0 | 2 | 6 | 2 |
| 94 | A1 | 2 | 0 | 4, 9 | 0 | 1 | 6 | 2 |
| 95 | A1 | 2 | 0 | 1 | 0 | 2 | 6 | 2 |
| 96 | A1 | 2 | 0 | 4 | 0 | 2 | 6 | 2 |
| 97 | A1 | 2 | 0 | 7 | 0 | 2 | 6 | 2 |
| 98 | A1 | 1 | 0 | 4 | 0 | 1 | 6 | 2 |
| 99 | A1 | 1 | 0 | 1, 6 | 0 | 1 | 6 | 2 |
| 100 | A1 | 1 | 0 | 4, 9 | 0 | 1 | 6 | 2 |
| 101 | A1 | 1 | 0 | 1 | 0 | 2 | 6 | 2 |
| 102 | A1 | 1 | 0 | 7 | 0 | 2 | 6 | 2 |
| 103 | A1 | 1 | 0 | 2, 7 | 0 | 2 | 6 | 2 |
| 104 | A1 | 1 | 0 | 1, 4, 7 | 0 | 2 | 6 | 2 |
| 105 | A1 | 1 | 0 | 0, 2, 4, 6, 8 | 0 | 2 | 6 | 2 |
| 106 | A1 | 1 | 0 | 0, 1, 2, 3, 4, 5, 6, 7, 8, 9 | 0 | 2 | 6 | 2 |
| 107 | A1 | 1 | 0 | 1, 3, 5, 7, 9 | 0 | 2 | 6 | 2 |

From Table 4, it can be observed that, for all of the PRACH configurations 87-107, the PRACH slot structure is the same, i.e. there are 6 consecutive PRACH transmission occasions in a row. However, there may be other scenarios or use cases, for example in future 6G radio access systems, where this number of PRACH transmission occasions in the time domain is not needed, and a different number of PRACH transmission occasions would be more beneficial instead. Thus, it may be beneficial to provide a mechanism for allocating PRACH transmission occasions in a more flexible manner.

One example scenario may be to support wireless networks with ultra-dense subnetworks. For example, ultra-dense subnetworks may occur in an industrial facility with thousands of robots, for example in the automotive industry or in warehouses.

Figure 7A:
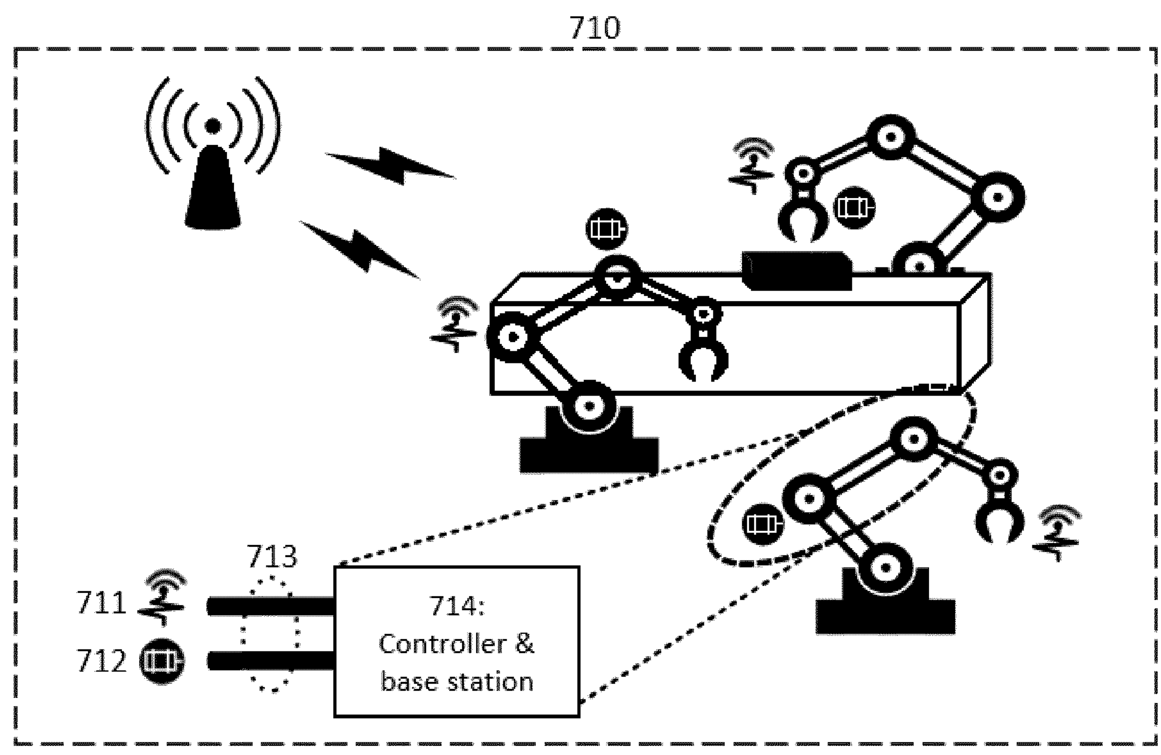
FIGS. 7A and 7B illustrate examples of network deployments in a factory.

FIG. 7A illustrates a legacy 5G NR network deployment 710 in a factory, i.e. an industry 4.0 scenario, which uses 5G small cells to communicate with assembly robots. For example, there may be up to 2500 cells per square kilometer. In this case, the robots can be considered as UEs. The sensors 711 and actuators 712, which are parts of a single robot, are connected to a robot controller 714 via wired connections 713.

Figure 7B:
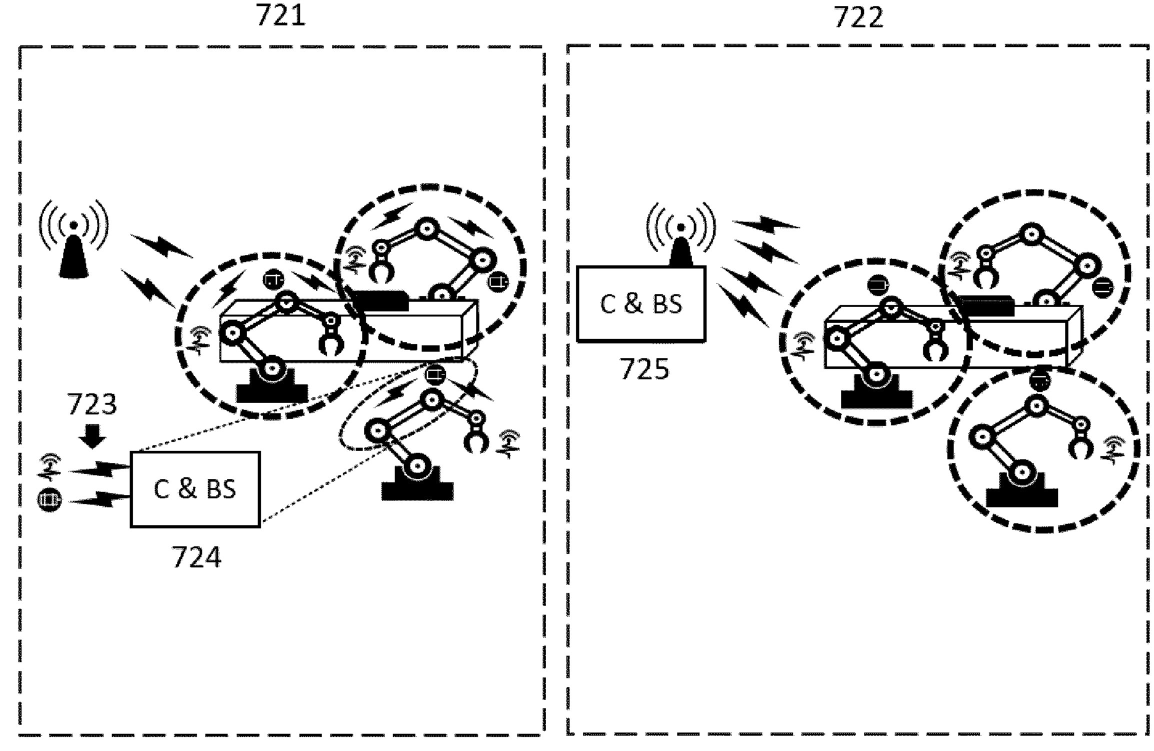

FIG. 7B illustrates a factory wireless network deployment with ultra-dense subnetworks according to an exemplary embodiment. For example, in an ultra-dense network, there may be up to 40000 subnetworks and 10 million devices per square kilometer. In FIG. 7B, in an in-robot cell deployment 721, each sensor and actuator of a robot is wirelessly connected 723 to a combined robot controller and base station 724. The combined robot controller and base station together with the wireless sensors and actuators form a subnetwork that does not directly communicate with other subnetworks.

In an in-production-module cell deployment 722, a combined robot controller and base station 725 controls a group of robots in a production module, and communicates wirelessly with the sensors and actuators of the group of robots. In other words, in the in-robot cell deployment 721, a given robot comprises a dedicated controller and base station combination 724, whereas in the in-production-module cell deployment a single controller and base station combination 725 may be associated with multiple robots.

For example, if a factory or warehouse has 1000-10000 subnetworks, and each robot has 10 or more sensors and actuators, then there may be issues with the random access procedure due to the limitation in the total number of available PRACH preambles, and/or high interference due to a small reuse distance caused by the PRACH configuration. The issues may become even worse in scenarios, where the robots and subnetworks are not stationary. On the other hand, a single subnetwork may have a limited number of devices under its control, for example in the order of 20. In this situation, it may not make much sense to define more than 1 PRACH occasion within a PRACH slot, if it can be assumed that e.g. 64 preambles are available per PRACH occasion. In other words, with the current definition of the example PRACH configurations (87-107 of Table 4), there may be an unnecessary overprovisioning of PRACH transmission opportunities. Therefore, it may be beneficial to introduce a mechanism for flexibly defining the start symbols of a PRACH preamble within a PRACH slot, and procedures to coordinate the allocations across many subnetworks.

Some exemplary embodiments enable defining PRACH transmission occasions in a PRACH slot in a flexible manner, and signaling the defined PRACH transmission occasions over the network.

Figure 8:
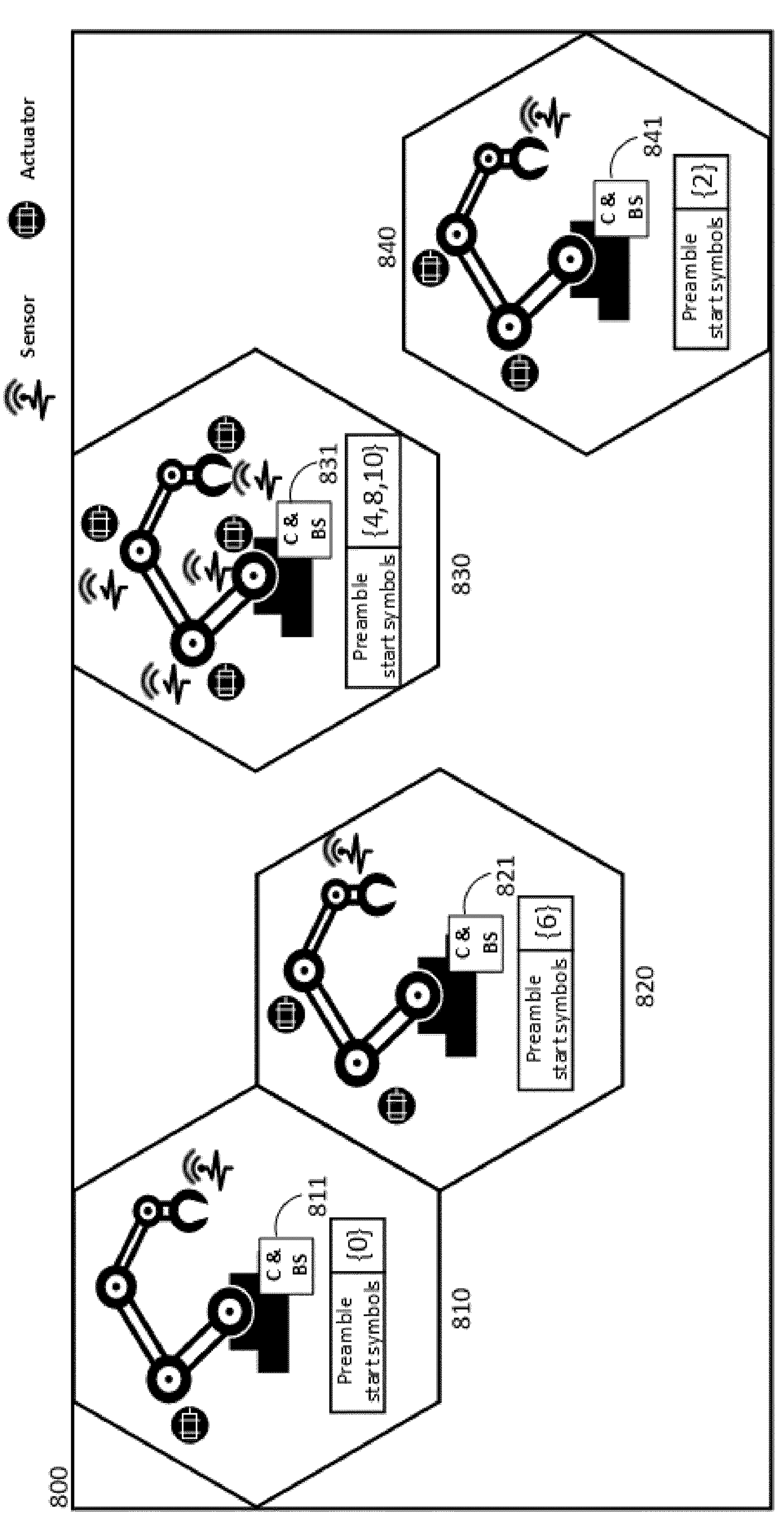
FIG. 8 illustrates an example of a factory subnetwork deployment according to an exemplary embodiment.

FIG. 8 illustrates an example of a factory subnetwork deployment according to an exemplary embodiment, where each robot operates its own subnetwork 810, 820, 830, 840 in a factory 800. A combined base station and controller 811, 821, 831, 841 per robot communicates wirelessly with the sub-components, such as sensors and/or actuators, of a given robot. The subcomponents can be considered as UEs, and a random-access procedure may be needed by the subcomponents for example in order to acquire initial access to the corresponding combined base station and controller.

In order to allow a very small preamble configuration reuse distance, some exemplary embodiments may provide a flexible allocation mechanism of preamble transmission occasions within a PRACH slot. A given subnetwork may decide autonomously which PRACH slot allocation is the best choice within its coverage range. In this deployment, no interference is expected from neighbour subnetwork preamble transmissions, provided that the time offset between two subnetworks is within a preamble cyclic prefix minus delay spread. From the example deployment in FIG. 8, it can be observed that a given set of subnetwork-configured preamble transmission start symbols are selected such that PRACH preamble transmissions from neighboring subnetworks do not interfere, provided that preamble duration is less than or equal to 2 symbols. For example, the first subnetwork 810 may allocate start symbol {0}, the second subnetwork 820 may allocate start symbol {6}, the third subnetwork 830 may allocate start symbols {4,8,10}, and the fourth subnetwork 840 may allocate start symbol {2} for PRACH preamble transmissions from the respective UEs.

As an example, for PRACH configuration 98, the same preamble signature can be used as long as the distance is smaller than 703 m (assuming a 4.69 us delay spread). Due to the orthogonality in the time domain, it is possible to use the same preambles in all of the subnetworks. Herein orthogonality means that, due to non-overlapping PRACH transmissions in time, no interference is expected from a neighbour subnetwork. Alternatively, preambles in different subnetworks may be generated from disjoint sets of root sequences. In some exemplary embodiments, configuration of overlapping PRACH transmission occasions may also be used.

Figure 9:
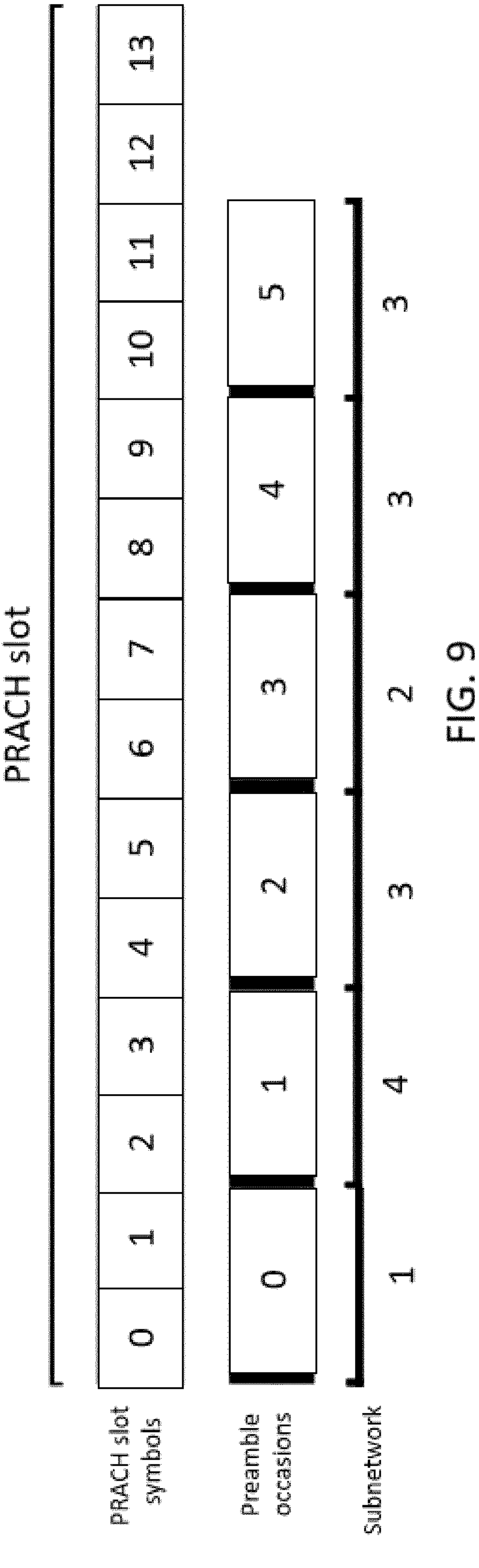
FIG. 9 illustrates an example allocation of random-access preamble transmission occasions within a factory subnetwork.

FIG. 9 illustrates a non-limiting example allocation of time-domain PRACH preamble transmission occasions within a factory subnetwork (for example according to the example deployment of FIG. 8). The PRACH preamble transmission occasions may be defined, for example, as the PRACH slot symbols to be used, or as indices for the PRACH preamble transmission occasions. For example, a first subnetwork may use slot symbol {0}, a second subnetwork may use slot symbol {6}, a third subnetwork may use slot symbols {4,8,10}, and a fourth subnetwork may use slot symbol {2} for PRACH preamble transmissions. Orthogonality in the time domain may enable all subnetworks to use the same PRACH preamble.

For example, in order to achieve full flexibility and even more benefit, new bit string elements may be included in the RRC information elements RACH-ConfigGeneric and RACH-ConfigGenericTwoStepRA. A bit string is a sequence of bits.

In a first non-limiting example, the bit string specifies the start symbols of PRACH occasions within a PRACH slot. In other words, the set of PRACH transmission occasions may be indicated as one or more bits corresponding with one or more PRACH preamble transmission start symbols. As a non-limiting example, the size (i.e. the number of bits) of the bit string may be 14, but it should be noted that other bit string sizes may also be used. An extension of the RACH-ConfigGeneric information element for 4-step RACH (random-access channel) is presented below according to the first example.

```
RACH-ConfigGeneric ::= SEQUENCE {
...
  [[
    preambleStartSymbolsWithinPRACHSlot    BIT STRING (SIZE(14))
  ]]
...
}
```

An extension of the RACH-ConfigGenericTwoStepRA information element for 2-step RACH is presented below according to the first example.

```
RACH-ConfigGenericTwoStepRA-r16 ::= SEQUENCE {
...
  [[
    preambleStartSymbolsWithinPRACHSlot    BIT STRING (SIZE(14))
  ]]
...
}
```

In a second non-limiting example, the bit string defines the PRACH transmission occasions as active preamble indices within a PRACH slot. For example, a PRACH slot may comprise 7 indexed preambles, and the bit string indicates which preamble indices within the PRACH slot the UE is allowed to use for transmitting a PRACH preamble. In other words, the PRACH transmission occasions may be indicated as one or more bits in the bit string, wherein the one or more bits correspond with one or more PRACH preamble indices. Thus, the preamble indices may specify the location of a given bit in the bit string. For example, a preamble index 0 (i.e. the first bit in the bit string) may refer to the first preamble transmission opportunity in the PRACH slot, a preamble index 1 (i.e. the second bit in the bit string) may refer to the second preamble transmission opportunity in the PRACH slot, and a preamble index 6 (i.e. the seventh bit in the bit string) may refer to the seventh preamble transmission opportunity in the PRACH slot. A value '1' of a given bit may indicate that the UE is allowed to transmit a PRACH preamble at the corresponding preamble index, whereas a value '0' of a given bit may indicate that the UE is not allowed to transmit a PRACH preamble at the corresponding preamble index. For example, if a first bit of the bit string is set to a value '1', it may activate use of preamble index 0. As a non-limiting example, a bit string [1,1,1,0,0,0,0] may indicate that the UE is allowed to transmit a PRACH preamble at preamble indices 0, 1 and 2 (i.e. during the first, second and third transmission opportunities), whereas the UE is not allowed to transmit a PRACH preamble at preamble indices 3, 4, 5 and 6 (i.e. during the fourth, fifth, sixth and seventh transmission opportunities). The exact transmission timing can be calculated by the UE with knowledge of the PRACH configuration index that provides info on the tabulated starting symbol. The size, or length, of the bit string (i.e. the number of bits in the bit string) may be equal to the maximum number of indexed preambles within a PRACH slot. 7 may currently be the maximum number of time domain preamble opportunities within a PRACH slot. However, it should be noted that the maximum number of preamble opportunities within a PRACH slot may change in the future, and thus some exemplary embodiments may use a different bit string size than 7. The corresponding extensions of the information elements for 4-step and 2-step RACH, respectively, are presented below.

```
RACH-ConfigGeneric ::= SEQUENCE {
...
  [[
    enabledPreambleOccasionsWithinPRACHSlot BIT STRING
    (SIZE(7))
  ]]
...
}
RACH-ConfigGenericTwoStepRA-r16 ::= SEQUENCE {
...
  [[
    enabledPreambleOccasionsWithinPRACHSlot BIT STRING
    (SIZE(7))
  ]]
...
}
```

When coordination between neighbouring gNBs is needed, then the bit-string pattern (of either example) can be sent, for example, in the "Served Cell Information" information element in XN SETUP REQUEST/RESPONSE messages. As another example, it can be included in the "Served Cell Information" information element in an NG-RAN NODE CONFIGURATION UPDATE message from a gNB to its neighbour. Alternatively, it can be included in some other message, such as a dedicated message for that purpose. These message(s) may be sent over the Xn interface between gNBs.

Figure 10:
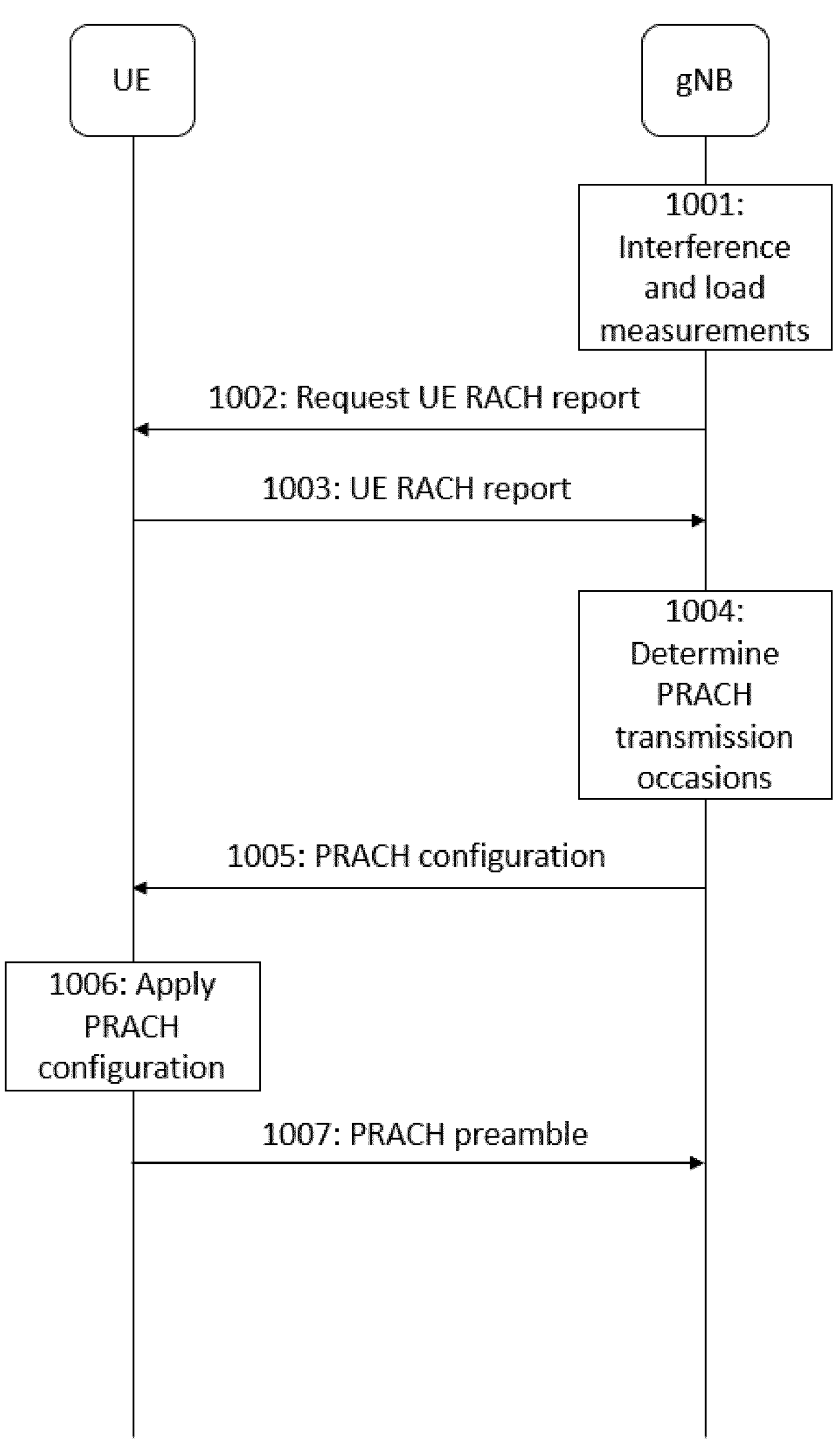
FIG. 10 illustrates a signaling diagram according to an exemplary embodiment.

FIG. 10 illustrates a signaling diagram according to an exemplary embodiment for an autonomous network deployment. An autonomous network, i.e. a subnetwork, can be considered, for example, as an advanced 5G or 6G radio network with limited coverage and without a direct communication link between neighbour networks. A non-limiting example of an autonomous network is an assembly factory, where each robot operates its own subnetwork to communicate with robot subcomponents, such as sensors and/or actuators (for example as illustrated in block 721 of FIG. 7A). A given subnetwork may make decisions on PRACH configuration without involvement of other subnetworks.

Referring to FIG. 10, at step 1001, a base station such as a gNB performs cell interference measurements (e.g. received signal power over thermal noise), load measurements (e.g. number of received PRACH preambles), and/or presence detection (e.g. via cognitive radio detection techniques) on a set of candidate PRACH transmission occasions. The set of candidate transmission occasions may comprise configured PRACH occasions and/or potential occasions, which are currently unused.

At step 1002, the base station may further transmit a RACH report request to at least one UE. The RACH report request may be indicated, for example, via UEInformationRequest or via a new procedure. The request for the UE RACH report may be triggered by the interference and/or load measurement results, for example if the interference and/or load measurement results are above or below a pre-defined threshold value.

At step 1003, the at least one UE transmits a UE RACH report to the base station in response to the request. For example, the UE RACH report may comprise information on a number of random-access attempts per SSB index and/or information on experienced contention events. Alternatively, the at least one UE may transmit the UE RACH report to the base station without any request message from the base station. In this case, the UE RACH report transmission may be triggered by an internal procedure at the UE, for example when a new RACH entry is logged into the UE RACH report or when a certain number of RACH entries has been logged.

At step 1004, the base station determines, for example periodically or upon a trigger event (e.g. a sudden high interference situation), a set of suitable PRACH transmission occasions within a PRACH slot based at least partly on the interference measurements, the load measurements, and/or the UE RACH report(s).

At step 1005, the base station transmits a PRACH configuration to the at least one UE to indicate a bit pattern that defines the determined PRACH transmission occasions within a PRACH slot. For example, the PRACH configuration may be transmitted via RRC signaling information to all UEs within the coverage range of its cells. This information may be broadcasted, for example, by using a system information block type-1 (SIB1) message.

At step 1006, the at least one UE applies the time-domain occasion configuration within a PRACH slot as part of the PRACH configuration settings. If a random-access procedure is initiated, then at step 1007 at least one UE transmits a PRACH preamble to the base station on an allowed PRACH occasion indicated by the configuration.

The functions and/or blocks described above by means of FIG. 10 are in no absolute chronological order, and some of them may be performed simultaneously or in an order differing from the described one. Other functions and/or blocks may also be executed between them or within them.

Figure 11:
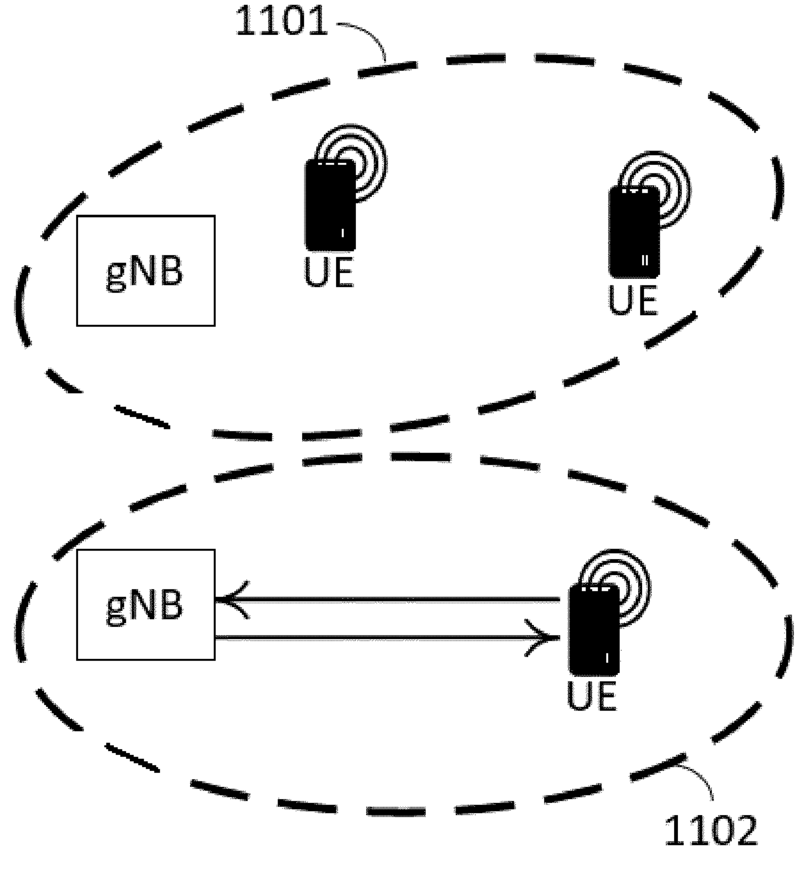
FIG. 11 illustrates a network according to an exemplary embodiment.

FIG. 11 illustrates an exemplary embodiment of an autonomous network corresponding with FIG. 10. In an autonomous network deployment, gNBs determine the best transmission occasions within a PRACH slot without inter-gNB coordination. In this example, UEs served in a first cell may transmit PRACH preambles starting at symbol 4, 8 or 10. UEs served in a second cell may start PRACH preamble transmission at symbol 0, 2 or 6.

Figure 12:
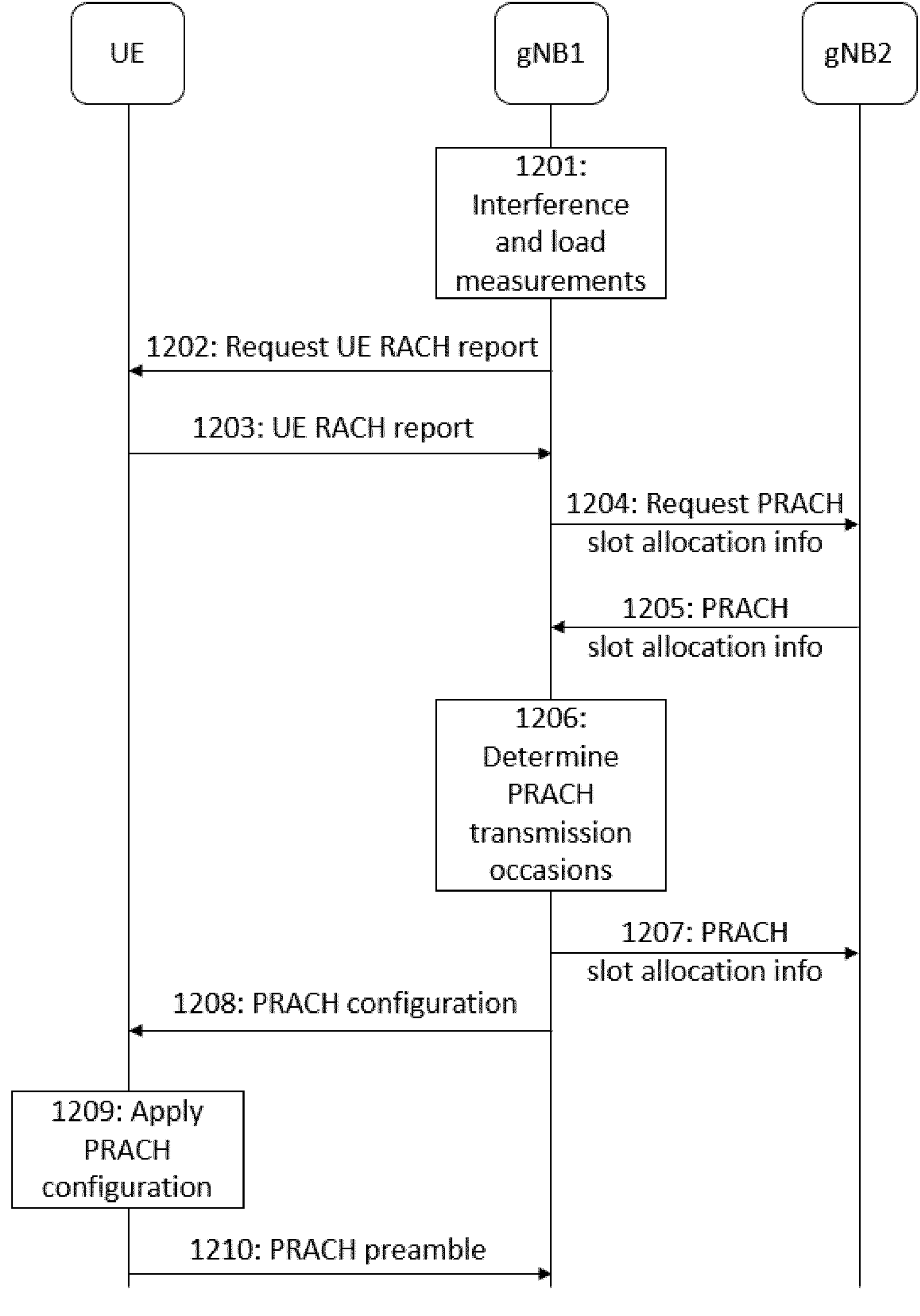
FIG. 12 illustrates a signaling diagram according to an exemplary embodiment.

FIG. 12 illustrates a signaling diagram according to another exemplary embodiment. In this exemplary embodiment, the base station has full control over the PRACH allocation and may take into account allocations in neighbour base station(s) via the Xn interface in order to avoid interference and undesired access attempts.

Referring to FIG. 12, at step 1201, a first base station such as a gNB (denoted as gNB1) performs cell interference measurements (e.g. received signal power over thermal noise), load measurements (e.g. received preambles), and/or presence detection (e.g. via cognitive radio detection techniques) on a set of candidate transmission occasions. The set of candidate transmission occasions may comprise configured PRACH occasions and/or potential occasions, which are currently unused.

At step 1202, the first base station may further transmit a UE RACH report request to at least one UE. The UE RACH report request may be indicated, for example, via UEInformationRequest or via a new procedure.

At step 1203, the at least one UE transmits a UE RACH report to the first base station in response to the request. Alternatively, the at least one UE may transmit the UE RACH report to the first base station without any request message from the first base station. In this case, the UE RACH report transmission may be triggered by an internal procedure at the UE, for example when a new RACH entry is logged into the UE RACH report or when a certain number of RACH entries has been logged.

At step 1204, the first base station may explicitly request PRACH slot allocation information from one or more second base stations (denoted as gNB2), i.e. one or more neighbour base stations. The one or more second base stations may also be referred to as one or more second network nodes. Alternatively, the one or more second base stations may autonomously transmit the PRACH slot allocation information to the first base station for example periodically or upon a higher layer trigger event (i.e. without an explicit request from the first base station).

At step 1205, the first base station may receive the PRACH slot allocation information from the one or more second base stations. The PRACH slot allocation information may comprise information on the utilization of PRACH slots by the UE(s) of a given second base station. The first base station and the one or more second base stations may exchange the information for example in an XN SETUP REQUEST/RESPONSE message, in an NG-RAN NODE CONFIGURATION UPDATE message, or in some other message such as a dedicated message for that purpose. As a non-limiting example, there may be 10-100 second base stations, from which the PRACH slot allocation information is obtained.

At step 1206, the first base station determines, for example periodically or upon a trigger event (e.g. a sudden high interference situation), a set of suitable PRACH transmission occasions within a PRACH slot based at least partly on the interference measurements, the load measurements, the UE RACH report(s), and/or the PRACH slot allocation information received from the one or more second base stations.

At step 1207, the first base station indicates the determined PRACH transmission occasions within a PRACH slot, i.e. the used PRACH slot allocations, to the one or more second base stations.

At step 1208, the base station transmits a PRACH configuration to the at least one UE to indicate a bit pattern that defines the determined PRACH transmission occasions within a PRACH slot. For example, the PRACH configuration may be transmitted via RRC signaling information to all UEs within the coverage range of its cells. This information may be broadcasted, for example, by using a SIB1 message.

At step 1209, the at least one UE applies the time-domain occasion configuration within a PRACH slot as part of the PRACH configuration settings. If a random-access procedure is initiated, then at step 1210 the at least one UE transmits a PRACH preamble to the base station on an allowed PRACH transmission occasion indicated by the configuration.

The functions and/or blocks described above by means of FIG. 12 are in no absolute chronological order, and some of them may be performed simultaneously or in an order differing from the described one. Other functions and/or blocks may also be executed between them or within them.

Figure 13:
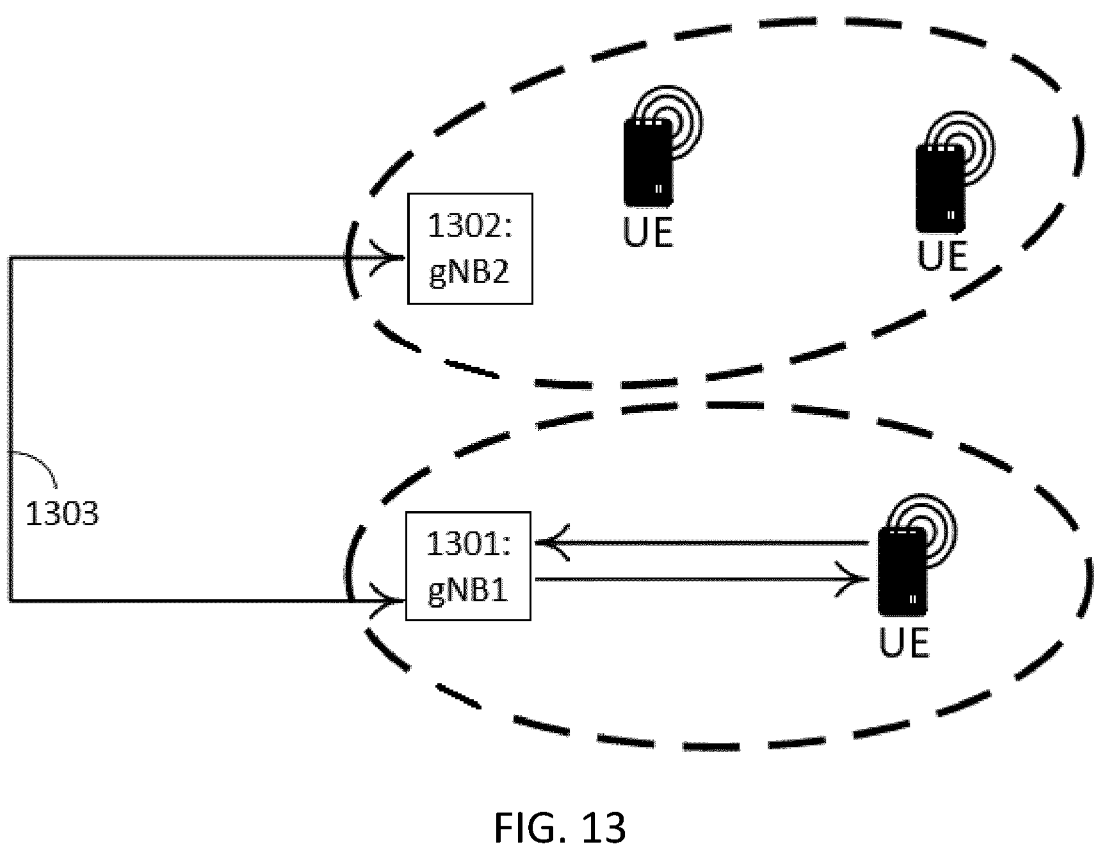
FIG. 13 illustrates a network according to an exemplary embodiment.

FIG. 13 illustrates an exemplary embodiment of a network corresponding with FIG. 12. FIG. 13 illustrates a network deployment with a possibility to coordinate PRACH slot preamble occasion configuration, characterized for example by a set of start symbols, between two base stations 1301, 1302 via an Xn interface 1303.

Figure 14:
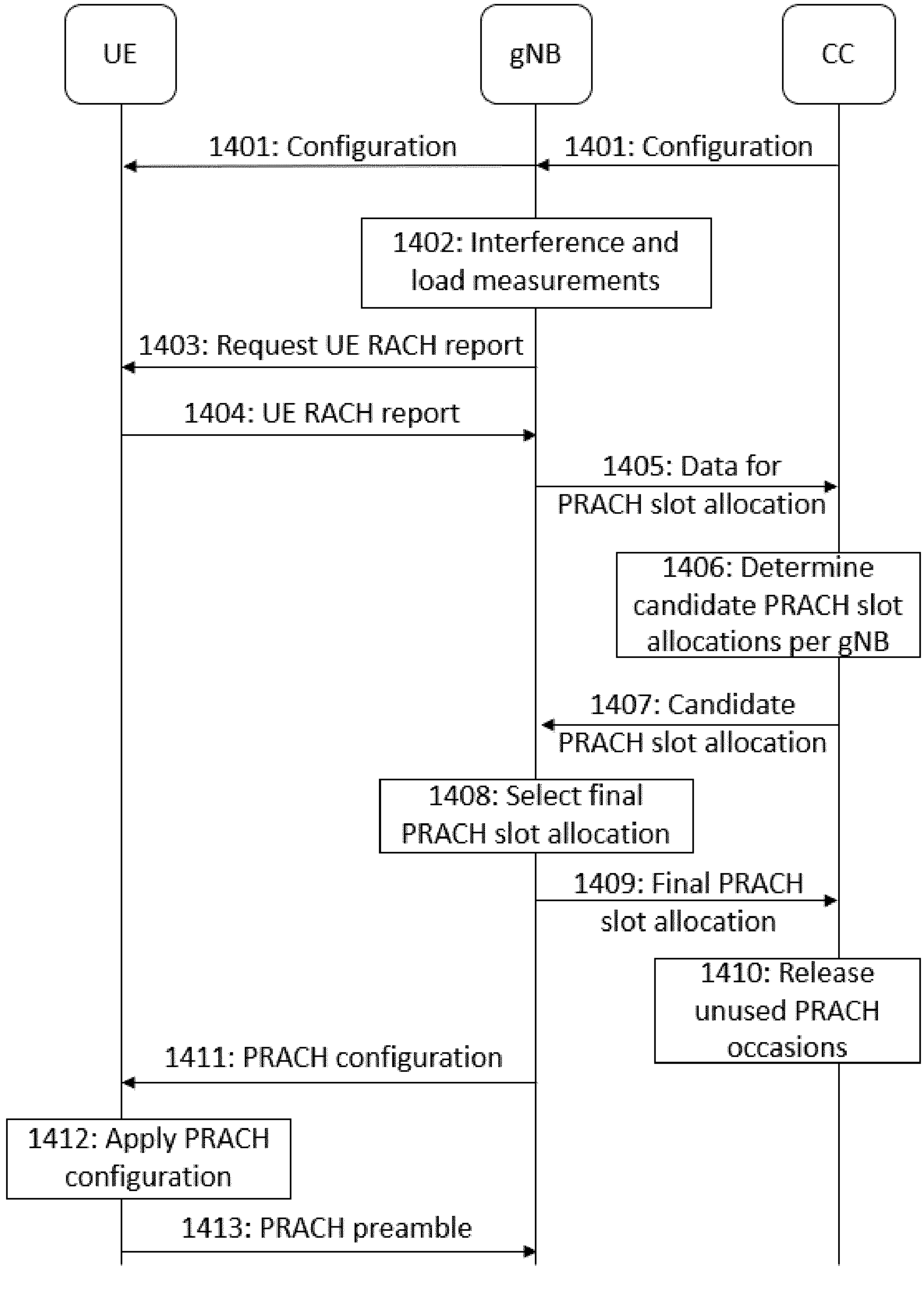
FIG. 14 illustrates a signaling diagram according to an exemplary embodiment.

FIG. 14 illustrates a signaling diagram according to an exemplary embodiment for a network deployment with a control center (CC) or a cloud server farm. A cloud server farm may comprise a plurality of server computers. In this network deployment scenario, part of the procedure for allocating time-domain instances for PRACH preamble transmission within a PRACH slot is implemented in a control center or cloud server farm. This control center may also be part of an operations, administration and maintenance (OAM) function or a non-real time RAN intelligent controller (RIC). The control center is a centralized entity that may cover a very large geographical area and control/manage a large number of base stations (potentially several thousands of base stations).

Referring to FIG. 14, at step 1401, a control center (CC) (or a cloud server farm) transmits a measurement configuration to at least one base station such as a gNB. The measurement configuration may indicate what type of information the control center (or cloud server farm) needs from the base station(s) and UE(s) in order to run its PRACH slot allocation procedure. The at least one base station may forward the UE part of the measurement configuration to at least one UE. The UE part of the measurement configuration may comprise instructions for, for example, transmitting UE RACH report and/or information on the UE's utilization of PRACH transmission occasions (for example PRACH slots).

At step 1402, the at least one base station performs, according to the measurement configuration, cell interference measurements (e.g. received signal power over thermal noise), load measurements (e.g. received preambles), and/or presence detection (e.g. via cognitive radio detection techniques) on a first set of candidate transmission occasions. The first set of candidate transmission occasions may comprise configured PRACH occasions and/or potential occasions, which are currently unused.

At step 1403, the at least one base station may further transmit a UE RACH report request to at least one UE. The UE RACH report request may be indicated, for example, via UEInformationRequest or via a new procedure.

At step 1404, the at least one UE transmits a UE RACH report to the at least one base station in response to the request. Alternatively, the at least one UE may transmit the UE RACH report to the at least one base station without any request message from the at least one base station. In this case, the UE RACH report transmission may be triggered by an internal procedure at the UE, for example when a new RACH entry is logged into the UE RACH report or when a certain number of RACH entries has been logged. The at least one UE may also transmit information on the UE's utilization of PRACH transmission occasions to the at least one base station.

At step 1405, the at least one base station transmits supportive data to the control center (or cloud server farm) to support the PRACH slot allocation procedure in the control center (or cloud server farm). The supportive data may comprise the information indicated in the measurement configuration. The supportive data may comprise, for example, the interference measurement information, the load measurement information, the UE RACH report(s), and/or information on the UE's utilization of PRACH transmission occasions. The supportive data may also comprise PRACH slot allocation information received from one or more neighbour base stations. The supportive data may be transmitted periodically, or upon an event trigger, or upon receiving a request for the supportive data from the control center (or cloud server farm).

At step 1406, the control center (or cloud server farm) determines, per base station, a second set of candidate PRACH transmission occasions within a PRACH slot based at least partly on the supportive data. The second set of candidate PRACH transmission occasions comprises proposed transmission occasions that may be used for PRACH transmissions. The second set of candidate PRACH transmission occasions may be a subset of the first set of candidate PRACH transmission occasions. The determining of the second set of candidate PRACH transmission occasions may be performed, for example, periodically or upon a trigger event.

At step 1407, the control center (or cloud server farm) indicates, to the at least one base station, a base-station-specific candidate PRACH slot allocation comprising the determined second set of candidate PRACH transmission occasions within a PRACH slot for that base station. The second set of candidate PRACH transmission occasions may be indicated in a dedicated message for that purpose, for example.

At step 1408, the at least one base station selects, based on near-real-time updates on decisive information and/or information that is locally accessible by the at least one base station, a subset of PRACH transmission occasions to be used within its coverage area from the second set of candidate PRACH transmission occasions in the received candidate PRACH slot allocation. The selection defines the final PRACH slot allocation.

At step 1409, the at least one base station indicates the final PRACH slot allocation, i.e. the selected subset of PRACH transmission occasions, to the control center (or cloud server farm) for example in a dedicated message for that purpose. The at least one base station may also indicate the final PRACH slot allocation to one or more neighbour base stations.

Upon receiving the indication for the final slot allocation, at step 1410 the control center (or cloud server farm) releases unused PRACH occasions for further optimization across the network.

At step 1411, the at least one base station transmits a PRACH configuration to the at least one UE to indicate a bit pattern that defines the selected subset of PRACH transmission occasions within a PRACH slot. For example, the PRACH configuration may be transmitted via RRC signaling information to all UEs within the coverage range of its cells. This information may be broadcasted, for example, by using a SIB1 message.

At step 1412, the at least one UE applies the time-domain occasion configuration within a PRACH slot as part of the PRACH configuration settings. If a random-access procedure is initiated, then at step 1413 the at least one UE transmits a PRACH preamble to the at least one base station on an allowed PRACH occasion indicated by the configuration.

The functions and/or blocks described above by means of FIG. 14 are in no absolute chronological order, and some of them may be performed simultaneously or in an order differing from the described one. Other functions and/or blocks may also be executed between them or within them.

Figure 15:
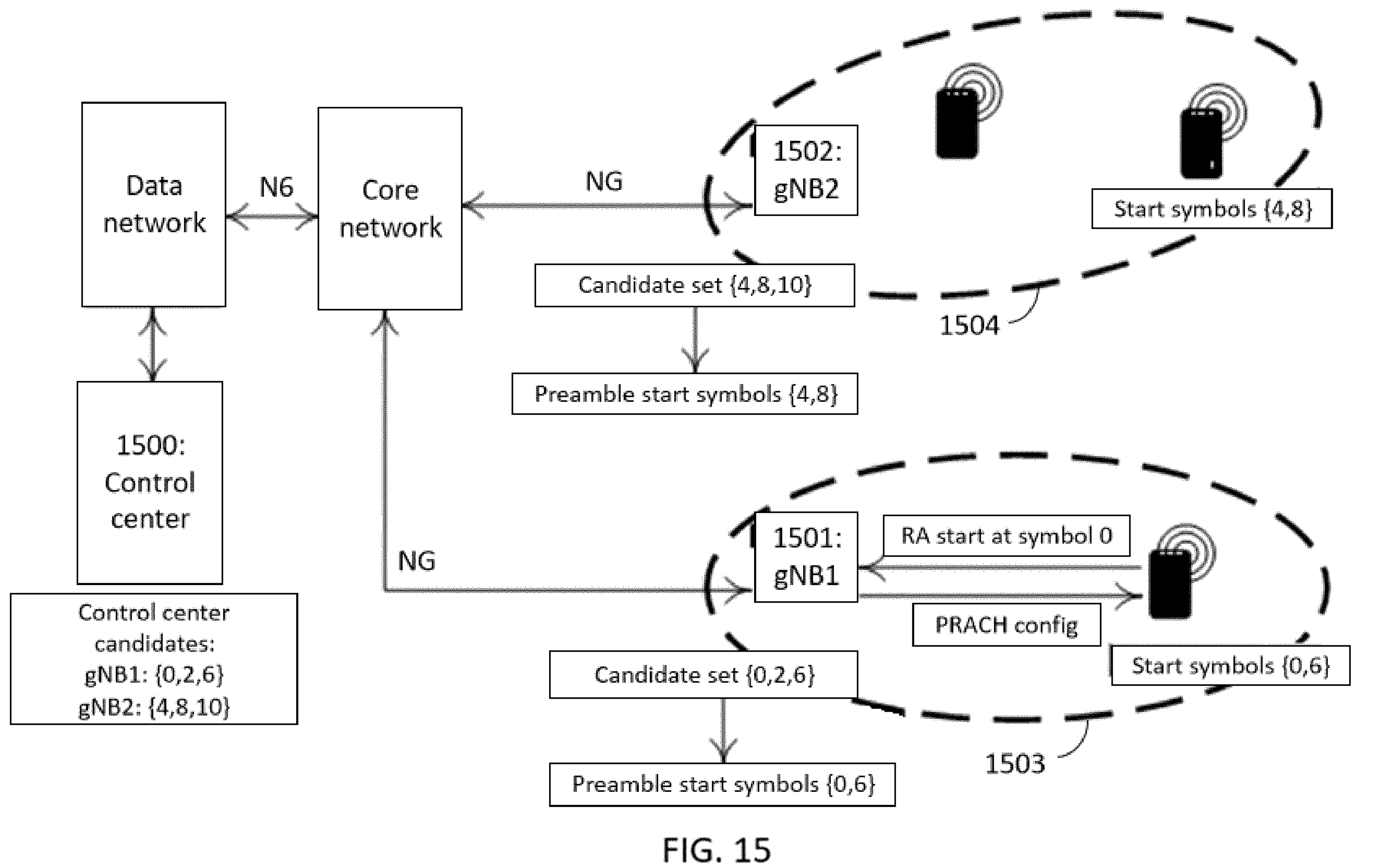
FIG. 15 illustrates a network according to an exemplary embodiment.

FIG. 15 illustrates an exemplary embodiment of a network with a control center 1500, which may apply the procedures illustrated in FIG. 14. The control center 1500 determines, for each gNB 1501, 1502 under its control, a set of start symbols within a PRACH slot. The gNBs may select a subset of the received candidate start symbols for defining the PRACH slot start symbols.

As a non-limiting example, a first gNB 1501 may receive candidate start symbols 0, 2 and 6 from the control center 1500, and the first gNB may select start symbols 0 and 6 to be used within its cell 1503. The first gNB indicates its selection to the control center to further optimize PRACH symbol allocation over the network.

As another non-limiting example, a second gNB 1502 may receive candidate start symbols 4, 8 and 10 from the control center 1500, and the second gNB may select start symbols 4 and 8 to be used within its cell 1504. The second gNB indicates its selection to the control center to further optimize PRACH symbol allocation over the network.

In another exemplary embodiment, PRACH transmission occasions within a PRACH slot may be flexibly communicated and coordinated in a CU-DU split base station architecture (for example in the network illustrated in FIG. 2). PRACH transmission occasion information may be communicated and coordinated over the F1 interface between a CU and one or more DUs. The one or more DUs may provide supportive data to the CU for PRACH slot allocation at the CU. The load level per PRACH occasion within a PRACH slot may be signalled over the F1 interface. The CU may also receive other information from one or more UEs, such as UE RACH reports, and/or information from other CUs or base stations via the Xn interface. The CU may then determine and indicate a candidate PRACH slot allocation to the one or more DUs. The one or more DUs then select a PRACH slot allocation from the candidate set indicated by the CU, and the one or more DUs indicate the selected PRACH slot allocation to the CU. The CU then releases the unused PRACH occasions.

As an example, the bit-string pattern information coming from neighbouring gNBs may be sent to a DU in an F1 SETUP RESPONSE, GNB-DU CONFIGURATION UPDATE ACKNOWLEDGE, and/or GNB-CU CONFIGURATION UPDATE message. However, other messages, such as a dedicated message, may also be used to carry this information. A DU can inform its CU about its bit-string information in the "Served Cell information" information element in an F1 SETUP REQUEST and/or GNB-DU CONFIGURATION UPDATE message, for example. However, other messages may also be used.

In another exemplary embodiment, a set of candidate PRACH slot allocations may be provided to the CU by a control center or cloud server farm.

In order to enable triggering the exchange of the bit-string in case of a CU-DU split architecture, a new information element may be reported by the DU to the CU to provide information on the load level per PRACH occasion within a PRACH slot. The DU may perform load measurements on all possible used and unused PRACH occasions configured for this DU. The load may be quantified, for example, as measured interference levels or a number of detected PRACH preambles. This way, the CU or management network gains knowledge on the PRACH occasion usage, and that information can be used in case reconfiguration is needed. For example, the new information element may be part of a GNB DU STATUS INDICATION message and/or part of a RESOURCE STATUS UPDATE message in the F1 application protocol. However, other messages, such as a dedicated message, over F1AP may also be used. Initialization of the load measurements (for example the measured interference levels or the number of detected PRACH preambles) from a gNB to another can be done with a RESOURCE STATUS REQUEST message, for example. The recipient node can accept the initiation of the requested load measurement in a RESOURCE STATUS RESPONSE message, and send the load information in the RESOURCE STATUS UPDATE message.

Depending on how the PRACH transmissions occasions are specified, there may be at least two options. The first option applies if PRACH occasions within PRACH slot are indicated by start symbols. In this case, the length of the information sequence may be 14, for example. The second option applies if the PRACH occasions are indicated via the preamble index in a PRACH slot. In this case, the information sequence length may be 7, for example.

The sequence elements may be integers with a value range from (0 . . . maxValue). For example, the value for maxValue may be 1023. However, other values for maxValue may also be used. If the load is a power quantity, then the power value may be mapped to an integer value (e.g. a power value relative to noise floor expressed in dB). Alternatively, the sequence elements may represent an index to a table that maps an index to a load value. The tabulated load values may be absolute or relative. For example, the table may be vendor-specific or specified by standards. The table may be static or dynamic. At least the CU and the DU may have access to the same table.

Table 5 shows a non-limiting example implementation for a load mapping table of size 8 that maps an index to a relative load value. A special interpretation may be assigned to table indices 0 and 7. For example, index 0 may indicate that there is no load, and index 7 may indicate an overload. The overload situation may be used as a trigger to perform a reallocation of the PRACH transmission occasions (i.e. to update the PRACH transmission occasions). It should be noted that Table 5 presents just one example implementation, and other alternatives may be used by some exemplary embodiments. For example, other less granular table alternatives are also possible with load mapping to {low, medium, high} values.

TABLE 5

| Index | Relative load |
|---|---|
| 0 | No load |
| 1 | 0 < load ≤ 0.2 |
| 2 | 0.2 < load ≤ 0.4 |
| 3 | 0.4 < load ≤ 0.6 |
| 4 | 0.6 < load ≤ 0.8 |
| 5 | 0.8 < load ≤ 0.9 |
| 6 | 0.9 < load ≤ 1.0 |
| 7 | Overload |

Tables 6 and 7 below show some non-limiting examples for the new information element as part of an enhanced GNB DU STATUS INDICATION message. In Table 6, maxValue represents an absolute maximum load level. In Table 7, the integer value represents an index to a table that maps an index to a load value, wherein (maxInt+1) is the table size.

Tables 8 and 9 below show some non-limiting examples for the new "RACH Load information" information element as part of an enhanced RESOURCE STATUS UPDATE message. In Tables 8 and 9, the information elements define RACH load information per cell. In these cases, a load indication for all cells covered by the DU may be obtained. In Table 8, maxValue represents an absolute maximum load level. In Table 9, the integer value represents an index to a table that maps an index to a load value, wherein (maxInt+1) is the table size.

In case of PRACH frequency multiplexing, load information may be averaged over a number of configured frequency occasions per PRACH time domain occasion.

TABLE 6

| Information element/ group name | Information element type and reference |
|---|---|
| RACH Load Information | Option 1:<br>SEQUENCE(SIZE(14)) OF INTEGER (0 . . . maxValue)<br>Option 2:<br>SEQUENCE (SIZE(7)) OF INTEGER (0 . . . maxValue) |

TABLE 7

| Information element/ group name | Information element type and reference |
|---|---|
| RACH Load Information | Option 1:<br>SEQUENCE(SIZE(14)) OF INTEGER (0 . . . maxInt)<br>Option 2:<br>SEQUENCE (SIZE(7)) OF INTEGER (0 . . . maxInt) |

TABLE 8

| Information element/ group name | Information element type and reference |
|---|---|
| Cell measurement result | |
| >Cell measurement result item | |
| >>RACH Load Information | Option 1:<br>SEQUENCE(SIZE(14)) OF INTEGER (0 . . . maxValue)<br>Option-2:<br>SEQUENCE (SIZE(7)) OF INTEGER (0 . . . maxValue) |

TABLE 9

| Information element/ group name | Information element type and reference |
|---|---|
| Cell measurement result | |
| >Cell measurement result item | |
| >>RACH Load Information | Option 1:<br>SEQUENCE(SIZE(14)) OF INTEGER (0 . . . maxInt)<br>Option 2:<br>SEQUENCE (SIZE(7)) OF INTEGER (0 . . . maxInt) |

Figure 16:
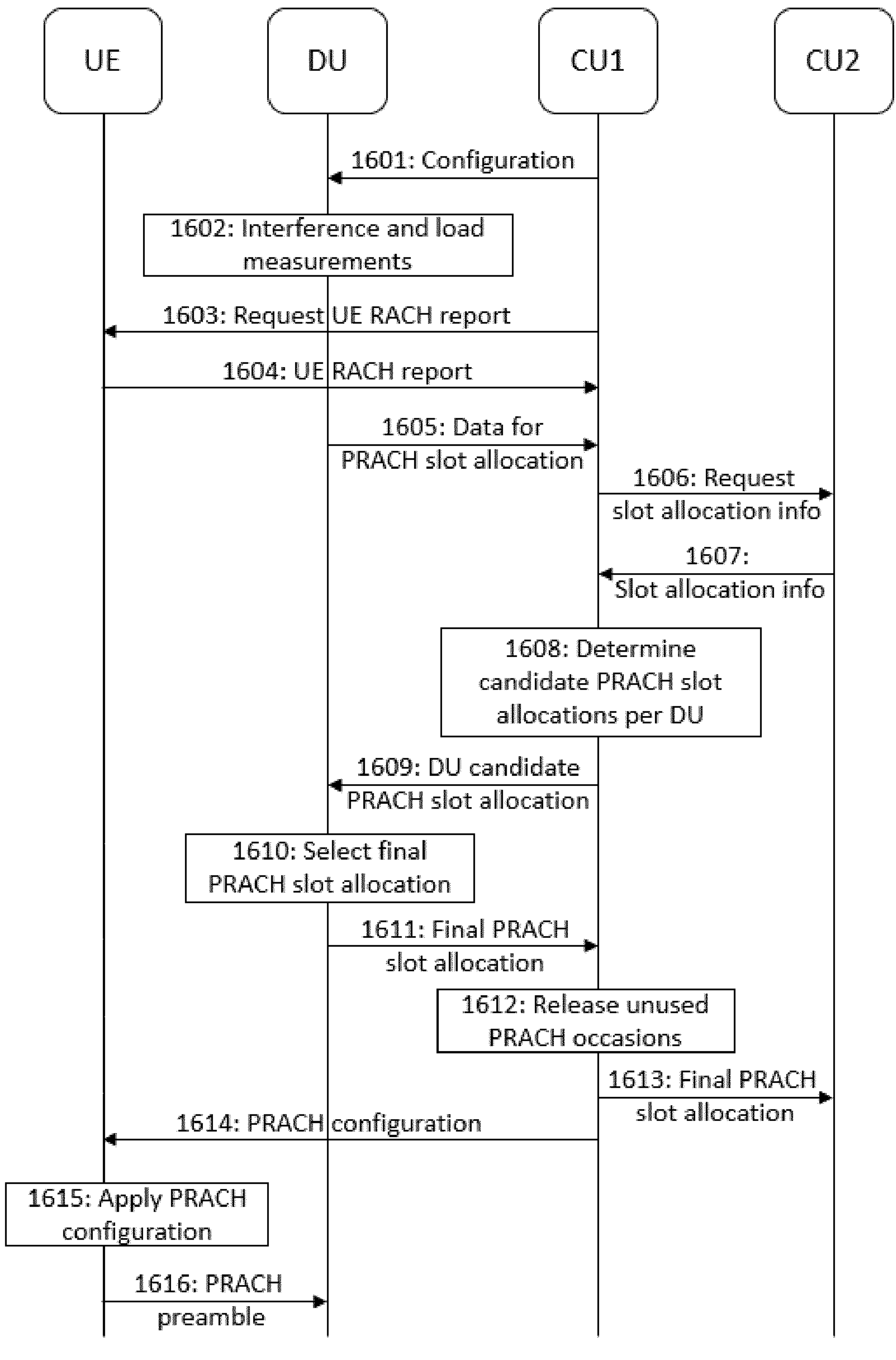
FIG. 16 illustrates a signaling diagram according to an exemplary embodiment.

FIG. 16 illustrates a signaling diagram according to an exemplary embodiment for a network with a CU-DU split base station architecture. All PRACH occasions may be potential candidates and do not have to be contiguous. In this exemplary embodiment, the CU may have full control over the allocation and may also take into account allocations in neighbour CUs via the Xn interface in order to avoid interference and undesired access attempts. In a CU-DU split architecture, the CU has the role of deciding the PRACH transmission occasions within a PRACH slot for the one or more DUs (cells) under its control. For example, the CU may transmit a dedicated message via the F1 interface to signal a set of candidate allocations to the one or more DUs. The one or more DUs then select an allocation from the set of candidate allocations. The one or more DUs report the selected allocation to the CU in order to release unused PRACH time occasions, and to initiate further optimization of the PRACH allocation between the one or more DUs within control of the CU, and possibly also to inform neighbour CUs on the current PRACH usage.

Referring to FIG. 16, at step 1601, a first CU (CU1) transmits a measurement configuration to at least one DU that the first CU is controlling. The measurement configuration may indicate what type of information the first CU needs from the DU(s) in order to run its PRACH slot allocation procedure.

At step 1602, the at least one DU performs, according to the measurement configuration, cell interference measurements (e.g. received signal power over thermal noise), load measurements (e.g. received preambles), and/or presence detection (e.g. via cognitive radio detection techniques) on a first set of candidate transmission occasions. The first set of candidate transmission occasions may comprise configured PRACH occasions and/or potential occasions, which are currently unused.

At step 1603, the first CU may further transmit a UE RACH report request to at least one UE. The UE RACH report request may be indicated, for example, via UEInformationRequest or via a new procedure.

At step 1604, the at least one UE transmits a UE RACH report to the first CU in response to the request. Alternatively, the at least one UE may transmit the UE RACH report to the first CU without any request message from the first CU. In this case, the UE RACH report transmission may be triggered by an internal procedure at the UE, for example when a new RACH entry is logged into the UE RACH report or when a certain number of RACH entries has been logged.

At step 1605, the at least one DU transmits supportive data to the first CU to support a PRACH slot allocation procedure in the first CU. The supportive data may comprise at least a subset of the information requested in the measurement configuration, such as the interference measurements and/or the load measurements. The supportive data may be transmitted periodically, or upon an event trigger, or upon receiving a request for the supportive data from the first CU. The supportive data may be transmitted via the F1 interface for example in a GNB-DU STATUS INDICATION message and/or in a RESOURCE STATUS UPDATE message as described previously. However, other messages may also be used.

At step 1606, the first CU may explicitly request PRACH slot allocation information from one or more second CUs (CU2), i.e. one or more neighbour CUs. The one or more second CUs may also be referred to as one or more second network nodes. In the request, the first CU may request PRACH slot allocation information of one or more specific DUs, or from all DUs that the one or more second CUs are controlling. Alternatively, the one or more second CUs may autonomously transmit the PRACH slot allocation information to the first CU for example periodically or upon a higher layer trigger event (i.e. without an explicit request from the first CU).

At step 1607, the first CU may receive PRACH slot allocation information for one or more DUs from the one or more second CUs. A cumulative reporting over all DUs may be specified to limit signaling overhead. The cumulative reporting means that the CU indicates which PRACH transmission occasion is used at least once over all of its DUs (e.g. just one bit pattern may be signalled). The first CU and the one or more second CUs may exchange the information for example in an XN SETUP REQUEST/RESPONSE message, in an NG-RAN NODE CONFIGURATION UPDATE message, or in some other message such as a dedicated message for that purpose.

At step 1608, the first CU determines, per DU, a second set of candidate PRACH transmission occasions within a PRACH slot based at least partly on the supportive data, the UE RACH report(s), and/or the PRACH slot allocation information received from the one or more second CUs. The second set of candidate PRACH transmission occasions may be determined for some or all of the DUs that the first CU is controlling. The determining of the second set of candidate PRACH transmission occasions may be performed, for example, periodically or upon a trigger event.

At step 1609, the first CU indicates, to the at least one DU via the F1 interface, a DU-specific candidate PRACH slot allocation comprising the determined second set of candidate PRACH transmission occasions within a PRACH slot for that DU. The second set of candidate PRACH transmission occasions may be indicated in a dedicated message for that purpose, for example.

At step 1610, the at least one DU selects a subset of PRACH transmission occasions to be used within its coverage area from the second set of candidate PRACH transmission occasions in the received candidate PRACH slot allocation. The selection defines the final PRACH slot allocation.

At step 1611, the at least one DU indicates the final PRACH slot allocation, i.e. the selected subset of PRACH transmission occasions, to the first CU via the F1 interface for example in a dedicated message for that purpose.

Upon receiving the indication, at step 1612 the first CU releases unused PRACH occasions and uses the information to further optimize PRACH slot allocations over its DU(s).

At step 1613, the first CU may indicate the final PRACH slot allocation of some or all of the at least one DUs to the one or more second CUs. For example, the one or more second CUs may request the final PRACH slot allocation of one or more specific DUs, in which case the final PRACH slot allocation of the one or more specific DUs may be transmitted to the one or more second CUs in response to the request. Alternatively, the first CU may transmit the final PRACH slot allocation of all DUs under its control without an explicit request from the one or more second CUs. Cumulative reporting over all DUs may be specified to limit signaling overhead. The final PRACH slot allocation may be indicated, for example, in an XN SETUP REQUEST/RESPONSE message, in an NG-RAN NODE CONFIGURATION UPDATE message, and/or in some other message, such as a dedicated message for that purpose. The final PRACH slot allocation may be indicated per DU, for example.

At step 1614, the first CU transmits a PRACH configuration to the at least one UE to indicate a bit pattern that defines the selected subset of PRACH transmission occasions within a PRACH slot. For example, the PRACH configuration may be transmitted via RRC signaling information to all UEs within the coverage range of its (DU) cells. This information may be broadcasted, for example, by using a SIB1 message.

At step 1615, the at least one UE applies the time-domain occasion configuration within a PRACH slot as part of the PRACH configuration settings. If a random-access procedure is initiated, then at step 1616 the at least one UE transmits a PRACH preamble to its respective DU on an allowed PRACH occasion indicated by the configuration.

The functions and/or blocks described above by means of FIG. 16 are in no absolute chronological order, and some of them may be performed simultaneously or in an order differing from the described one. Other functions and/or blocks may also be executed between them or within them.

Figure 17:
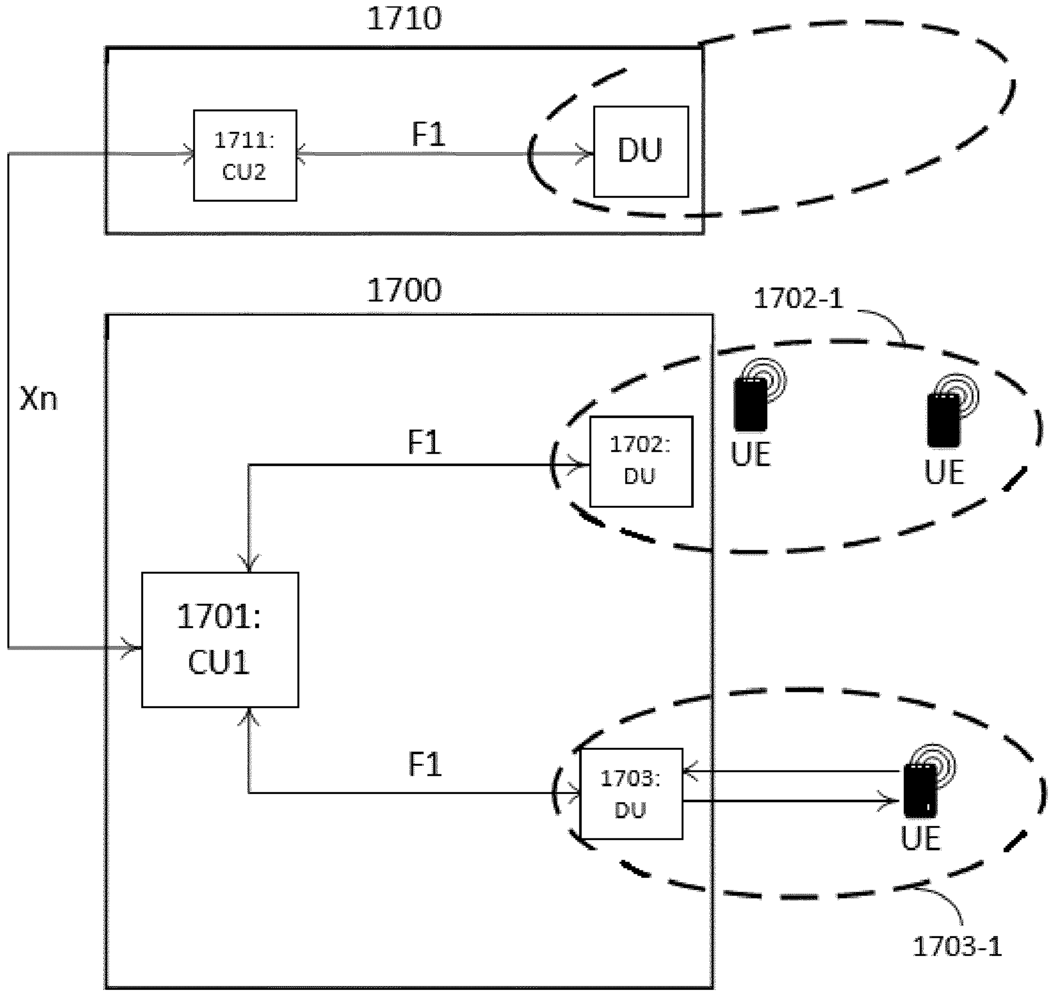
FIG. 17 illustrates a network according to an exemplary embodiment.

FIG. 17 illustrates an exemplary embodiment of a network with a CU-DU split base station, which may apply the procedures illustrated in FIG. 16. The CU 1701 of a first gNB 1700 makes decisions on PRACH slot configuration for its DUs 1702, 1703. Candidate PRACH slot allocations are transmitted to the DUs 1702, 1703 via the F1 interface, and each DU selects a final PRACH slot allocation from the candidates. The CU 1701 receives information on the final PRACH slot allocation per DU via the F1 interface, and that information is used for further optimization steps within the CU 1701, for coordination over the Xn interface between one or more neighbour CUs 1711 associated with one or more second gNBs 1710, as well as for PRACH configuration within each DU cell 1702-1, 1703-1.

Figure 18:
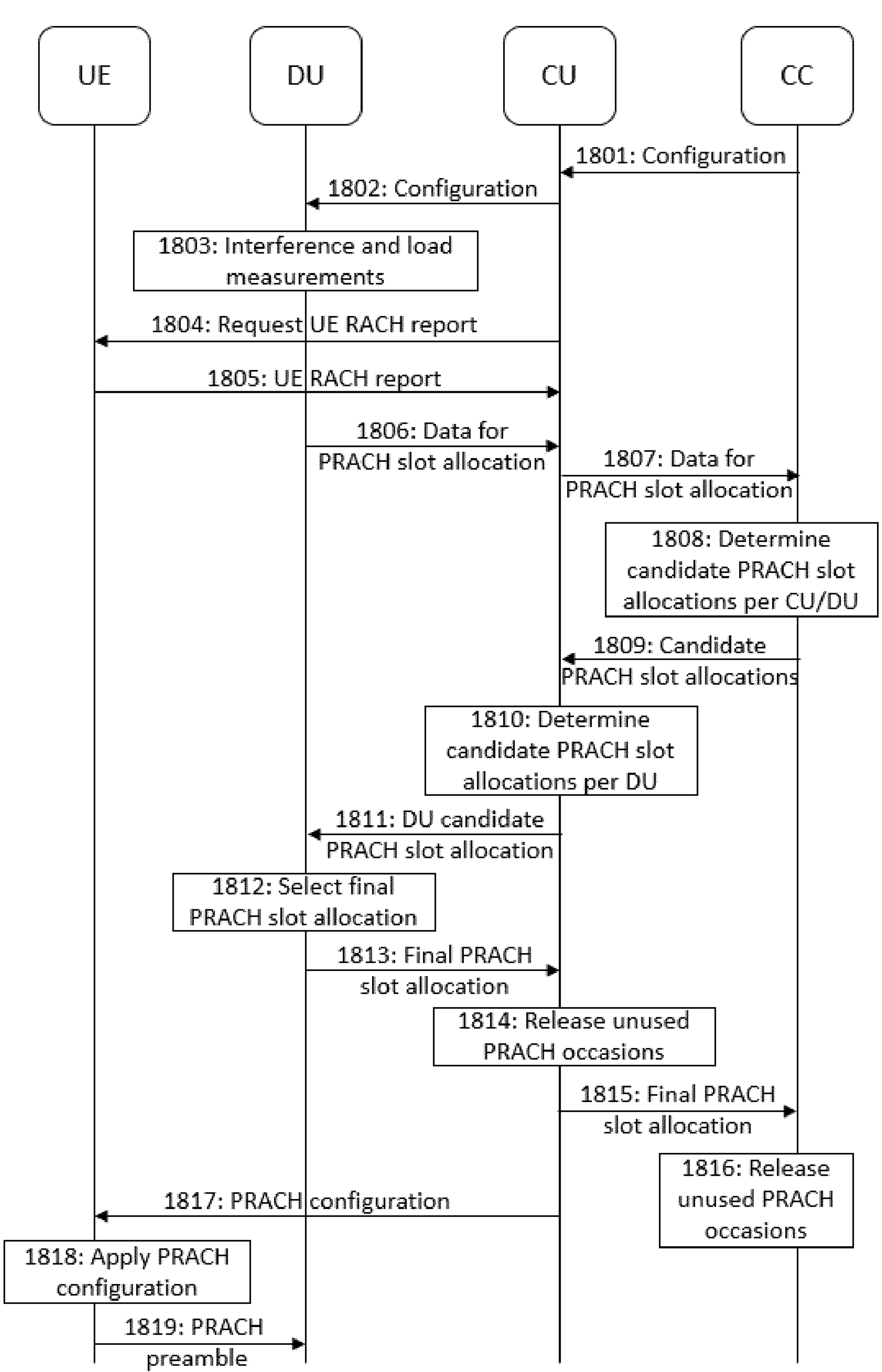
FIG. 18 illustrates a signaling diagram according to an exemplary embodiment.

FIG. 18 illustrates a signaling diagram according to an exemplary embodiment for a network with a CU-DU split base station architecture and a control center or cloud server farm. The control center may also be part of an OAM or non-real time RIC. The control center may cover a very large geographical area and control potentially several thousands of CUs.

Referring to FIG. 18, at step 1801, a control center (or cloud server farm) transmits a measurement configuration to a CU. At step 1802, the CU transmits at least a subset of the received measurement configuration to at least one DU that the CU is controlling. The measurement configuration may indicate what type of information (such as UE RACH report(s), interference measurements and/or load measurements) the control center (or cloud server farm) needs in order to run its PRACH slot allocation procedure.

At step 1803, the at least one DU performs, according to the measurement configuration, cell interference measurements (e.g. received signal power over thermal noise), load measurements (e.g. received preambles), and/or presence detection (e.g. via cognitive radio detection techniques) on a first set of candidate transmission occasions. The first set of candidate transmission occasions may comprise configured PRACH occasions and/or potential occasions, which are currently unused.

At step 1804, the CU may further transmit a UE RACH report request to at least one UE. The UE RACH report request may be indicated, for example, via UEInformationRequest or via a new procedure.

At step 1805, the at least one UE transmits a UE RACH report to the CU in response to the request. Alternatively, the at least one UE may transmit the UE RACH report to the CU without any request message from the CU. In this case, the UE RACH report transmission may be triggered by an internal procedure at the UE, for example when a new RACH entry is logged into the UE RACH report or when a certain number of RACH entries has been logged. The at least one UE may also transmit information on the UE's utilization of PRACH transmission occasions to the at least one CU.

At step 1806, the at least one DU transmits supportive data to the CU to support the PRACH slot allocation procedure at the CU. The supportive data may comprise at least a subset of the information requested in the measurement configuration, such as the interference measurements and/or the load measurements. The supportive data may be transmitted periodically, or upon an event trigger, or upon receiving a request for the supportive data from the CU. The supportive data may be transmitted via the F1 interface for example in a GNB-DU STATUS INDICATION message and/or in a RESOURCE STATUS UPDATE message as described previously. However, other messages may also be used.

At step 1807, the CU transmits the supportive data and/or the UE RACH report(s) and utilization information to the control center (or cloud server farm) to support the PRACH slot allocation procedure at the control center (or cloud server farm). The CU may add additional information to the supportive data transmitted to the control center (or cloud server farm). The CU may also conduct preprocessing, for example filtering, on the supportive data before transmitting it to the control center (or cloud server farm). The supportive data may also comprise PRACH slot allocation information received from one or more neighbour CUs.

At step 1808, the control center (or cloud server farm) determines, per CU or per DU, a second set of candidate PRACH transmission occasions within a PRACH slot based at least partly on the supportive data, and/or the UE RACH report(s). The determining of the second set of candidate PRACH transmission occasions may be performed, for example, periodically or upon a trigger event. The control center (or cloud server farm) may take into account, for example, the interference and load measurements over the possible time occasions, the UE RACH report(s), the information on the UE's utilization of PRACH transmission occasions, and/or PRACH slot allocation information indicated by the other CUs under its control.

At step 1809, the control center (or cloud server farm) transmits the determined CU-specific or DU-specific candidate PRACH slot allocation(s) to the CU and/or to the other CUs under its control. For example, a dedicated message may be used for this purpose.

At step 1810, from the received candidate PRACH slot allocation(s), the CU determines, per DU, a candidate PRACH slot allocation comprising a third set of candidate PRACH transmission occasions within a PRACH slot. In other words, the third set of candidate PRACH transmission occasions may be a subset of the second set of candidate PRACH transmission occasions. The third set of candidate PRACH transmission occasions may also be a subset of the first set of candidate PRACH transmission occasions. This third set of candidate PRACH transmission occasions may be determined for some or all of the DUs that the CU is controlling. The determining of the third set of candidate PRACH transmission occasions may be performed, for example, with an objective to maximize the orthogonality of PRACH occasions in the time domain, i.e. to avoid configuring the same PRACH time occasions in multiple DUs.

As a non-limiting example, the control center may determine PRACH occasions as a start symbol set per CU, for example {0,2,4,6,8,10} for the CU of FIG. 18. This set may then be transmitted as a CU-specific candidate PRACH slot allocation to the CU of FIG. 18. The CU may then determine a candidate PRACH slot allocation per DU, wherein a given DU-specific candidate PRACH slot allocation is a subset of the candidate set received from the control center. For example, from the candidate set {0,2,4,6,8,10} received from the control center, the CU may determine a first subset {4,8,10} for a first DU, and a second subset {0,2,6} for a second DU.

As another non-limiting example, the control center may determine PRACH occasions as a start symbol set per DU, for example a first candidate set {4,8,10} for a first DU, and a second candidate set {0,2,6} for a second DU. These occasion sets are transmitted to the CU of FIG. 18 as DU-specific candidate PRACH slot allocations. The CU may then forward the first candidate set {4,8,10} to the first DU, and the second candidate set {0,2,6} to the second DU. Alternatively, the CU may determine a subset of a given candidate set for the respective DU, for example by selecting a reduced first candidate set {4,8} for the first DU, instead of forwarding the full candidate set received from the control center.

At step 1811, the CU indicates, to the at least one DU via the F1 interface, the DU-specific candidate PRACH slot allocation comprising the determined third set of candidate PRACH transmission occasions within a PRACH slot for that DU. The third set of DU-specific candidate PRACH transmission occasions may be indicated in a dedicated message for that purpose, for example.

At step 1812, the at least one DU selects a subset of PRACH transmission occasions to be used within its coverage area from the third set of DU-specific candidate PRACH transmission occasions in the received DU-specific candidate PRACH slot allocation. The selection defines the final PRACH slot allocation.

At step 1813, the at least one DU indicates the final PRACH slot allocation, i.e. the selected subset of PRACH transmission occasions, to the CU via the F1 interface for example in a dedicated message for that purpose.

Upon receiving the indication, at step 1814 the CU releases unused PRACH occasions and uses the information to further optimize PRACH slot allocations over its DU(s).

At step 1815, the CU indicates the final PRACH slot allocation of some or all of the at least one DUs to the control center (or cloud server farm). Cumulative reporting over all DUs may be specified to limit signaling overhead. For example, a dedicated message may be used for this purpose.

Upon receiving the indication, at step 1816 the control center (or cloud server farm) releases unused PRACH occasions and uses the information to further optimize PRACH slot allocations over multiple CUs. For example, a dedicated message over an NG, N6, and/or OAM interface may be used for this purpose.

The CU may also indicate the final PRACH slot allocation of some or all of the at least one DUs to one or more neighbour CUs over the Xn interface. Cumulative reporting over all DUs may be specified to limit signaling overhead. The final PRACH slot allocation may be indicated to the one or more neighbour CUs for example in an XN SETUP REQUEST/RESPONSE message, in an NG-RAN NODE CONFIGURATION UPDATE message, and/or in some other message, such as a dedicated message for that purpose.

At step 1817, the CU transmits a PRACH configuration to the at least one UE to indicate a bit pattern that defines the selected subset of PRACH transmission occasions within a PRACH slot. For example, the PRACH configuration may be transmitted via RRC signaling information to all UEs within the coverage range of its (DU) cells. This information may be broadcasted, for example, by using a SIB1 message.

At step 1818, the at least one UE applies the time-domain occasion configuration within a PRACH slot as part of the PRACH configuration settings. If a random-access procedure is initiated, then at step 1819 the at least one UE transmits a PRACH preamble to its respective DU on an allowed PRACH occasion indicated by the configuration.

The functions and/or blocks described above by means of FIG. 18 are in no absolute chronological order, and some of them may be performed simultaneously or in an order differing from the described one. Other functions and/or blocks may also be executed between them or within them.

Figure 19:
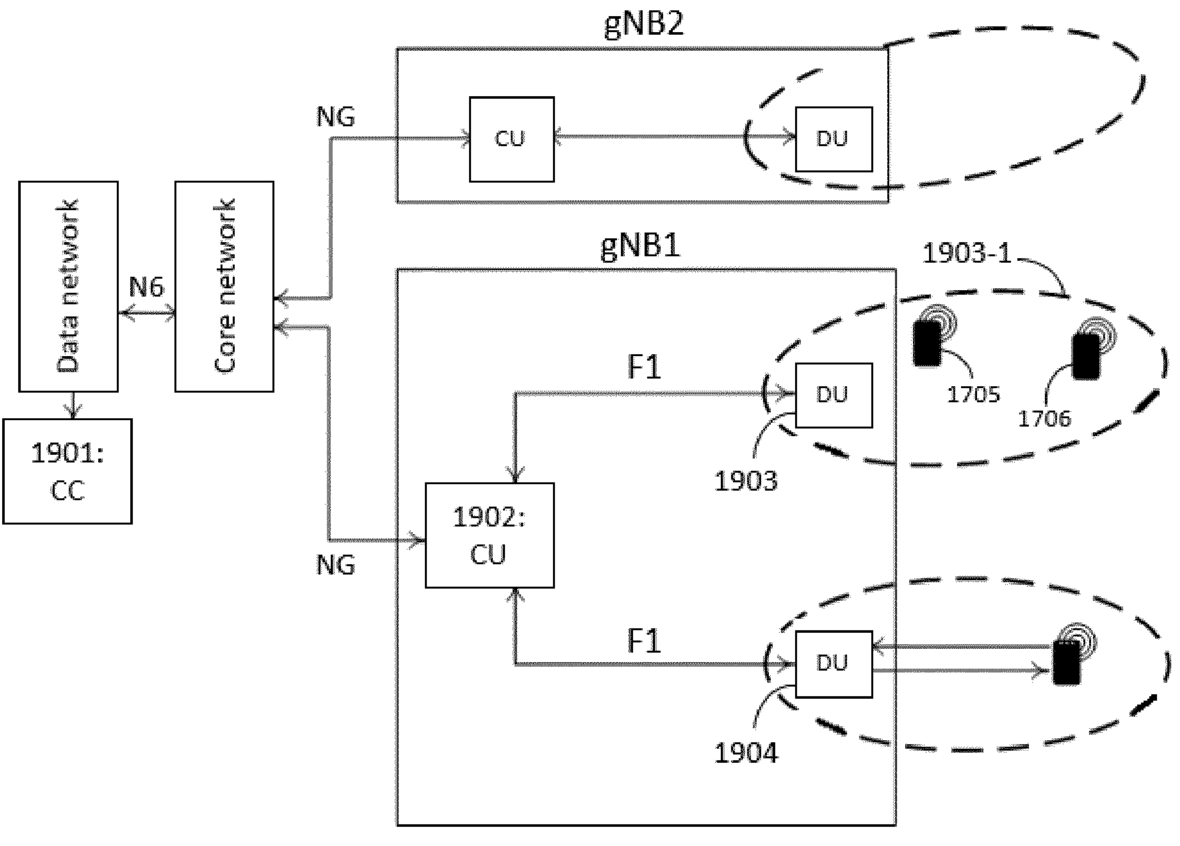
FIG. 19 illustrates a network according to an exemplary embodiment.

FIG. 19 illustrates an exemplary embodiment of a network with a CU-DU split base station and a control center, which may apply the procedures illustrated in FIG. 18. The control center 1901 determines, per CU or per DU under its control, candidate PRACH transmission occasions (for example characterized by a set of start symbols) within a PRACH slot. From the candidates, the CU 1902 may select a DU-specific subset of the PRACH slot start symbols per DU 1903, 1904 under its control. The DUs 1903, 1904 select the final PRACH slot allocation. As a non-limiting example, a first DU 1903 may select a configuration {4,8}, and a second DU 1904 may select {0,6} as the final PRACH slot allocation. Thus, after PRACH configuration signalling by the CU 1902, UEs 1905, 1906 within a first cell 1903-1 of the first DU 1903 may start preamble transmission on symbol 4 or 8 within a PRACH slot.

Figure 20:
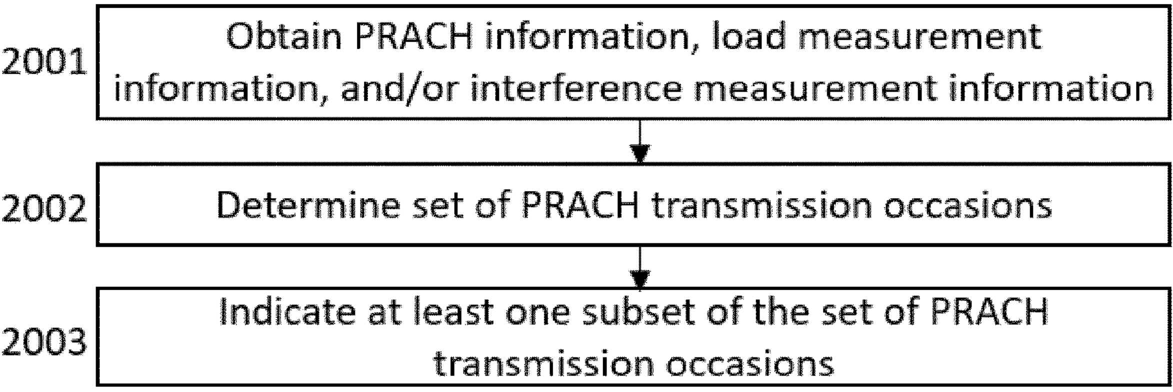
FIGS. 20-21 illustrate flow charts according to some exemplary embodiments.

FIG. 20 illustrates a flow chart according to an exemplary embodiment. The functions illustrated in FIG. 20 may be performed by an apparatus such as a base station (for example a gNB), a DU, a CU, a control center, or a cloud server farm. Referring to FIG. 20, at step 2001, at least one of the following is obtained: random-access channel information associated with at least one UE, load measurement information on a first set of candidate random-access channel transmission occasions, and interference measurement information on the first set of candidate random-access channel transmission occasions. At step 2002, from the first set of candidate random-access channel transmission occasions, a set of random-access channel transmission occasions within a physical random-access channel slot is determined based at least partly on the at least one of the random-access channel information, the load measurement information, and the interference measurement information. In other words, the determined set of random-access channel transmission occasions may be a subset of the first set of candidate random-access channel transmission occasions. At step 2003, at least one subset of the set of random-access channel transmission occasions is indicated to one or more first network nodes.

The one or more first network nodes may comprise, for example, at least one of the following: the at least one UE, at least one base station, at least one CU, at least one control center, at least one neighbour base station, and/or at least one neighbour CU.

For example, if the apparatus is a base station (or comprised in a base station), then the at least one subset of the set of random-access channel transmission occasions may be indicated to the one or more first network nodes, such as the at least one UE, and/or one or more neighbour base stations, and/or a centralized entity such as a control center.

As another example, if the apparatus is a CU (or comprised in a CU), then the at least one subset of the set of random-access channel transmission occasions may be indicated to the one or more first network nodes, such as the at least one UE, and/or one or more neighbour CUs, and/or a centralized entity such as a control center.

As another example, if the apparatus is a DU (or comprised in a DU), then the at least one subset of the set of random-access channel transmission occasions may be indicated to the one or more first network nodes, such as a CU.

As another example, if the apparatus is a control center (or comprised in a control center), then the at least one subset of the set of random-access channel transmission occasions may be indicated to the one or more first network nodes, such as at least one base station and/or at least one CU.

In another exemplary embodiment, the apparatus may transmit supportive data, i.e. at least one of the interference measurement information, the load measurement information, and the random-access channel information, to a third network node. The third network node may be, for example, a control center or a CU. A second set of candidate random-access channel transmission occasions may be received from the third network node. The set of random-access channel transmission occasions may be determined by selecting a subset of the second set of candidate random-access channel transmission occasions.

For example, an apparatus such as a CU may transmit the supportive data to a third network node such as a control center, and receive the second set of candidate random-access channel transmission occasions from the control center. The CU may determine the set of random-access channel transmission occasions by selecting a subset of the second set of candidate random-access channel transmission occasions. The CU may indicate the determined set of random-access channel transmission occasions to a fourth network node such as a DU, and receive at least one subset of the determined set of random-access channel transmission occasions from the DU. The CU may indicate the at least one subset of the determined set of random-access channel transmission occasions to one or more first network nodes, such as at least one UE.

In another exemplary embodiment, the apparatus may transmit, to a fifth network node, a message indicative of a measurement configuration for providing at least one of the interference measurement information and the load measurement information to the apparatus. The apparatus may further obtain, or receive, the at least one of the interference measurement information and the load measurement information from the fifth network node. For example, the apparatus may be a CU, and the fifth network node may be a DU. As another example, the apparatus may be a control center, and the fifth network node may be a CU or a base station such as a gNB.

Figure 21:
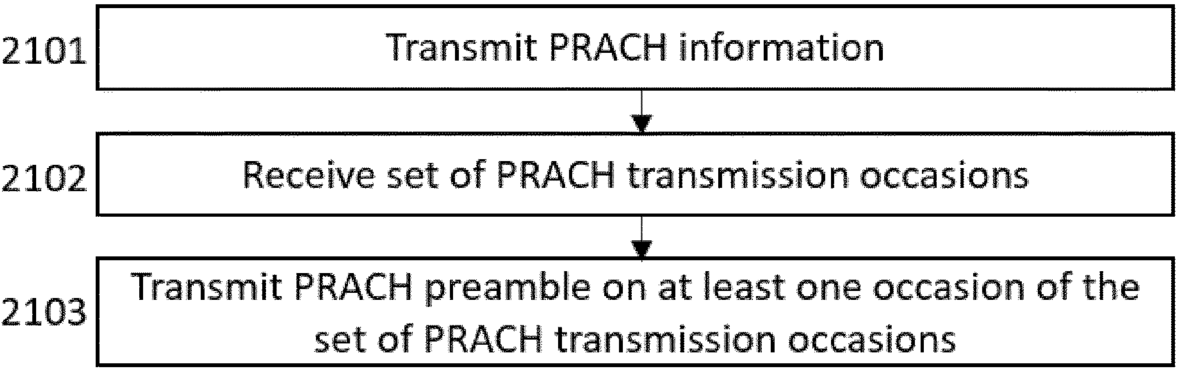

FIG. 21 illustrates a flow chart according to another exemplary embodiment. The functions illustrated in FIG. 21 may be performed by an apparatus such as, or comprised in, a UE. Referring to FIG. 21, at step 2101, random-access channel information indicating at least one or more random-access channel transmission occasions utilized by the apparatus for one or more random-access preamble transmissions is transmitted for example to a base station or a CU. The random-access channel information may also comprise a UE RACH report, for example. At step 2102, A message indicating a set of random-access channel transmission occasions within a PRACH slot is received for example from the base station or from the CU. At step 2103, a random-access preamble is transmitted for example to the base station or to a DU on at least one random-access channel transmission occasion indicated by, or comprised in, the set of random-access channel transmission occasions.

The functions and/or blocks described above by means of FIGS. 20-21 are in no absolute chronological order, and some of them may be performed simultaneously or in an order differing from the described one. Other functions and/or blocks may also be executed between them or within them.

A technical advantage provided by some exemplary embodiments is that they allow flexible allocation and signaling of PRACH transmission occasions within a PRACH slot, instead of using static PRACH transmission occasion locations. Thus, some exemplary embodiments may enable improved usage of radio resources. Some exemplary embodiments may provide contention-free, or almost contention-free, allocation of PRACH preamble transmission occasions to multiple UEs with low interference and low collisions between PRACH transmissions.

Figure 22:
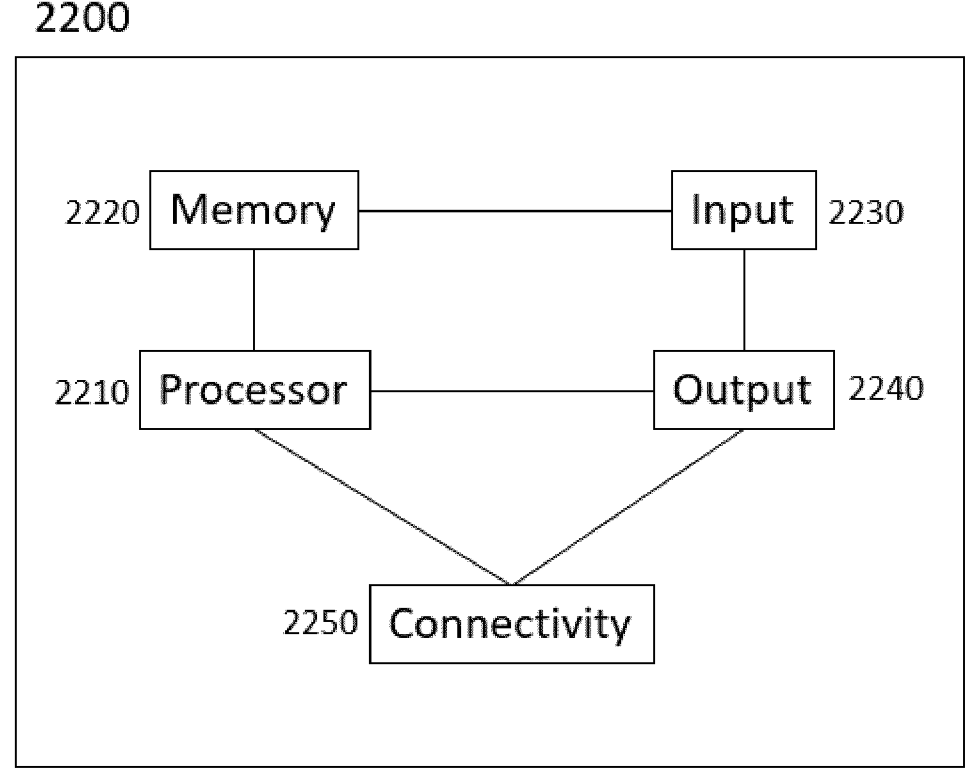
FIGS. 22-23 illustrate apparatuses according to some exemplary embodiments.

FIG. 22 illustrates an apparatus 2200, which may be an apparatus such as, or comprised in, a terminal device, according to an exemplary embodiment. A terminal device may also be referred to as a UE or user equipment herein. The apparatus 2200 comprises a processor 2210. The processor 2210 interprets computer program instructions and processes data. The processor 2210 may comprise one or more programmable processors. The processor 2210 may comprise programmable hardware with embedded firmware and may, alternatively or additionally, comprise one or more application-specific integrated circuits (ASICs).

The processor 2210 is coupled to a memory 2220. The processor is configured to read and write data to and from the memory 2220. The memory 2220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 2220 stores computer readable instructions that are executed by the processor 2210. For example, non-volatile memory stores the computer readable instructions and the processor 2210 executes the instructions using volatile memory for temporary storage of data and/or instructions.

The computer readable instructions may have been prestored to the memory 2220 or, alternatively or additionally, they may be received, by the apparatus, via an electromagnetic carrier signal and/or may be copied from a physical entity such as a computer program product. Execution of the computer readable instructions causes the apparatus 2200 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 2200 may further comprise, or be connected to, an input unit 2230. The input unit 2230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 2230 may comprise an interface to which external devices may connect to.

The apparatus 2200 may also comprise an output unit 2240. The output unit may comprise or be connected to one or more displays capable of rendering visual content, such as a light emitting diode (LED) display, a liquid crystal display (LCD) and/or a liquid crystal on silicon (LCoS) display. The output unit 2240 may further comprise one or more audio outputs. The one or more audio outputs may be for example loudspeakers.

The apparatus 2200 further comprises a connectivity unit 2250. The connectivity unit 2250 enables wireless connectivity to one or more external devices. The connectivity unit 2250 comprises at least one transmitter and at least one receiver that may be integrated to the apparatus 2200 or that the apparatus 2200 may be connected to. The at least one transmitter comprises at least one transmission antenna, and the at least one receiver comprises at least one receiving antenna. The connectivity unit 2250 may comprise an integrated circuit or a set of integrated circuits that provide the wireless communication capability for the apparatus 2200. Alternatively, the wireless connectivity may be a hardwired application-specific integrated circuit (ASIC). The connectivity unit 2250 may comprise one or more components such as a power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 2200 may further comprise various components not illustrated in FIG. 22. The various components may be hardware components and/or software components.

Figure 23:
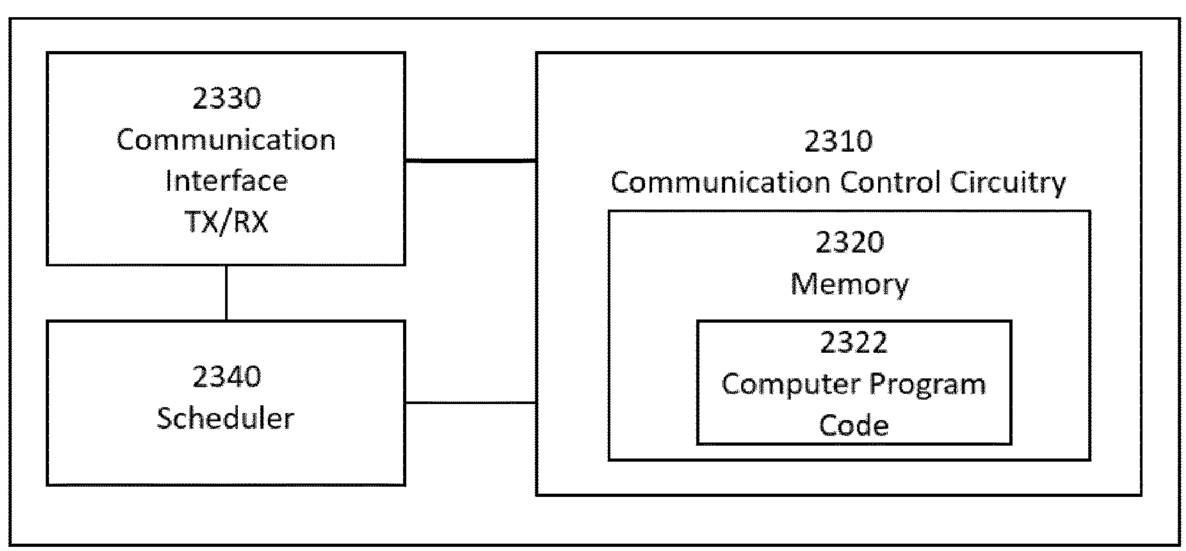

The apparatus 2300 of FIG. 23 illustrates an exemplary embodiment of an apparatus such as, or comprised in, a base station such as a gNB, or a distributed unit or a central unit of a split base station. The apparatus may comprise, for example, a circuitry or a chipset applicable to a base station to realize some of the described exemplary embodiments. The apparatus 2300 may be an electronic device comprising one or more electronic circuitries. The apparatus 2300 may comprise a communication control circuitry 2310 such as at least one processor, and at least one memory 2320 including a computer program code (software) 2322 wherein the at least one memory and the computer program code (software) 2322 are configured, with the at least one processor, to cause the apparatus 2300 to carry out some of the exemplary embodiments described above.

The processor is coupled to the memory 2320. The processor is configured to read and write data to and from the memory 2320. The memory 2320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 2320 stores computer readable instructions that are executed by the processor. For example, non-volatile memory stores the computer readable instructions and the processor executes the instructions using volatile memory for temporary storage of data and/or instructions.

The computer readable instructions may have been prestored to the memory 2320 or, alternatively or additionally, they may be received, by the apparatus, via an electromagnetic carrier signal and/or may be copied from a physical entity such as a computer program product. Execution of the computer readable instructions causes the apparatus 2300 to perform one or more of the functionalities described above.

The memory 2320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 2300 may further comprise a communication interface 2330 comprising hardware and/or software for realizing communication connectivity according to one or more communication protocols. The communication interface 2330 comprises at least one transmitter (TX) and at least one receiver (RX) that may be integrated to the apparatus 2300 or that the apparatus 2300 may be connected to. The communication interface 2330 provides the apparatus with radio communication capabilities to communicate in the cellular communication system. The communication interface may, for example, provide a radio interface to terminal devices. The apparatus 2300 may further comprise another interface towards a core network such as the network coordinator apparatus and/or to the access nodes of the cellular communication system. The apparatus 2300 may further comprise a scheduler 2340 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. A Central Unit (CU) of a base station (gNB) comprising:

at least one processor; and at least one memory including computer program code that, when executed by that at least one processor, cause the at least one processer to perform the following operations:

receive, from a control center (CC), a measurement configuration comprising instructions to provide at least one of interference measurement information and load measurement information to the CC;

transmit, to at least one Distributed Unit (DU), at least a subset of the measurement configuration;

transmit, to at least one User Equipment (UE), a request for a UE Random-Access Channel (RACH) report;

in response to the transmitted request, obtain RACH information associated with the at least one UE, wherein the RACH information comprises the UE RACH report defining one or more experienced contention events;

in response to the transmitted subset of the measurement configuration, receive, from the at least one DU, the load measurement information, and the interference measurement information, for a Physical RACH (PRACH) slot allocation procedure, wherein the load measurement information comprises a number of detected random-access preambles on a first set of candidate Random-Access Channel (RACH) transmission occasions, and wherein the interference measurement information comprises a measurement of received signal power over thermal noise;

receive, from one or more neighbor CUs, RACH slot allocation information;

transmit, to the CC, supportive data comprising the received load measurement information, the received interference measurement information, the obtained RACH information, and the received RACH slot allocation information;

in response to the transmitted supportive data, receive, from the CC, a second set of candidate RACH transmission occasions, wherein the second set of candidate RACH transmission occasions comprises a subset of the first set of candidate RACH transmission occasions and is determined by the CC based on the supportive data;

determine, from the second set of candidate RACH transmission occasions and based at least partly on the RACH information, the load measurements, the interference measurement information, and the RACH slot allocation information, a third set of candidate RACH transmission occasions for the at least one DU, wherein the third set of candidate RACH transmission occasions is within a physical RACH (PRACH) slot, and wherein determining the third set of candidate RACH transmission occasions further comprises selecting the third set of candidate RACH transmission occasions to be non-overlapping in time with RACH transmission occasions used by the one or more neighbor CUs;

transmit, to the at least one DU, the third set of candidate RACH transmission occasions;

in response to the transmitted third set of candidate RACH transmission occasions, receive, from the at least one DU, a message that defines a selected subset of RACH transmission occasions selected from the third set of candidate RACH transmission occasions;

release, based on the selected subset of RACH transmission occasions, one or more unused RACH transmission occasions from the third set of candidate RACH transmission occasions;

transmit, to the CC, the selected subset of RACH transmission occasions; and transmit, to the at least one UE via a system information block-type-1 (SIB1) Radio Resource Control (RRC) message, a bit string indicating the selected subset of RACH transmission occasions, wherein the bit string comprises a plurality of bits, each bit of the plurality of bits corresponds to a unique preamble transmission start symbol within the PRACH slot, and wherein a value of each bit of the plurality of bits indicates an enabled state or a disabled state for the corresponding unique preamble transmission start symbol.

2. The CU according to claim 1, wherein the computer program code, when executed by the at least one processor, further cause the at least one processor to perform the following operations:

receive, from the at least one UE, a random-access preamble on at least one RACH transmission occasion indicated by the selected subset of RACH transmission occasions.

3. The CU according to claim 2, wherein the computer program code, when executed by the at least one processor, further cause the at least one processor to perform the following operations:

request, from the one or more neighbor CUs, the RACH slot allocation information.

4. The CU according to claim 3, wherein the computer program code, when executed by the at least one processor, further cause the at least one processor to perform the following operations:

indicate, to the one or more neighbor CUs, the selected subset of RACH transmission occasions.

5. The CU according to claim 1, wherein the load measurement information and the interference measurement information are received from the at least one DU via a message on an F1 application protocol (F1AP) interface, and wherein the message is one of a GNB-DU STATUS INDICATION message or a RESOURCE STATUS UPDATE message.

6. The CU according to claim 5, wherein the load measurement information comprises a sequence of integer values, and wherein each integer value is an index that maps to a predefined load level in a load mapping table accessible by the CU.

7. The CU according to claim 6, wherein the RACH slot allocation information is received from the one or more neighbor CUs via a message on an Xn interface, and wherein the message is one of an XN SETUP message or an NG-RAN NODE CONFIGURATION UPDATE message.

8. The CU according to claim 7, wherein the computer program code, when executed by the at least one processor, further cause the at least one processor to perform the following operations:

after releasing the one or more unused RACH transmission occasions, perform an optimization of RACH slot allocations across one or more DUs controlled by the CU based on the selected subset of RACH transmission occasions.

9. The CU of claim 8, wherein the bit string is a bit string of size 14.

10. The CU of claim 9, wherein the computer program code, when executed by the at least one processor, further cause the at least one processor to perform the following operations: determine the third set of candidate RACH transmission occasions in response to a trigger event, the trigger event comprising at least one of a periodic timer expiring or a detection of an interference level exceeding a predefined threshold.

11. A method performed by a Central Unit (CU) of a base station (gNB), the method comprising:

receiving, from a control center (CC), a measurement configuration comprising instructions to provide at least one of interference measurement information and load measurement information to the CC;

transmitting, to the at least one Distributed Unit (DU), at least a subset of the measurement configuration;

transmit, to at least one User Equipment (UE), a request for a UE Random-Access Channel (RACH) report;

in response to the transmitted request, obtaining RACH information associated with the at least one UE, wherein the RACH information comprises the UE RACH report defining one or more experienced contention events;

in response to the transmitted subset of the measurement configuration, receiving, from the at least one DU, the load measurement information, and the interference measurement information, for a Physical RACH (PRACH) slot allocation procedure, wherein the load measurement information comprises a number of detected random-access preambles on a first set of candidate Random-Access Channel (RACH) transmission occasions, and wherein the interference measurement information comprises a measurement of received signal power over thermal noise;

receiving, from one or more neighbor CUs, RACH slot allocation information;

transmitting, to the CC, supportive data comprising the received load measurement information, the received interference measurement information, the obtained RACH information, and the received RACH slot allocation information;

in response to the transmitted supportive data, receiving, from the CC, a second set of candidate RACH transmission occasions, wherein the second set of candidate RACH transmission occasions comprises a subset of the first set of candidate RACH transmission occasions and is determined by the CC based on the supportive data;

determining, from the second set of candidate RACH transmission occasions and based at least partly on the RACH information, the load measurements, the interference measurement information, and the RACH slot allocation information, a third set of candidate RACH transmission occasions for the at least one DU, wherein the third set of candidate RACH transmission occasions is within a physical RACH (PRACH) slot, and wherein determining the third set of candidate RACH transmission occasions further comprises selecting the third set of candidate RACH transmission occasions to be non-overlapping in time with RACH transmission occasions used by the one or more neighbor CUs;

transmitting, to the at least one DU, the third set of candidate RACH transmission occasions;

in response to the transmitted third set of candidate RACH transmission occasions, receiving, from the at least one DU, a message that defines a selected subset of RACH transmission occasions selected from the third set of candidate RACH transmission occasions;

releasing, based on the selected subset of RACH transmission occasions, one or more unused RACH transmission occasions from the third set of candidate RACH transmission occasions;

transmitting, to the CC, the selected subset of RACH transmission occasions; and transmitting, to the at least one UE via a system information block-type-1 (SIB1) Radio Resource Control (RRC) message, a bit string indicating the selected subset of RACH transmission occasions, wherein the bit string comprises a plurality of bits, each bit of the plurality of bits corresponds to a unique preamble transmission start symbol within the PRACH slot, and wherein a value of each bit of the plurality of bits indicates an enabled state or a disabled state for the corresponding unique preamble transmission start symbol.

12. The method according to claim 11, wherein the method further comprises:

receiving, from the at least one UE, a random-access preamble on at least one RACH transmission occasion indicated by the selected subset of RACH transmission occasions.

13. The method according to claim 12, wherein the method further comprises:

requesting, from the one or more neighbor CUs, the RACH slot allocation information.

14. The method according to claim 13, wherein the method further comprises:

indicate, to the one or more neighbor CUs, the selected subset of RACH transmission occasions.

15. A non-transitory computer readable medium comprising program instructions for causing an apparatus, the apparatus being a Central Unit (CU) of a base station (gNB), to perform at least the following:

receiving, from a control center (CC), a measurement configuration comprising instructions to provide at least one of interference measurement information and load measurement information to the CC;

transmitting, to at least one Distributed Unit (DU), at least a subset of the measurement configuration;

transmitting, to at least one User Equipment (UE), a request for a UE Random-Access Channel (RACH) report;

in response to the transmitted request, obtaining RACH information associated with at least one UE, wherein the RACH information comprises the UE RACH report defining one or more experienced contention events;

in response to the transmitted subset of the measurement configuration, receiving, from the at least one DU, the load measurement information, and the interference measurement information, for a Physical RACH (PRACH) slot allocation procedure, wherein the load measurement information comprises a number of detected random-access preambles on a first set of candidate Random-Access Channel (RACH) transmission occasions, and wherein the interference measurement information comprises a measurement of received signal power over thermal noise;

receiving, from one or more neighbor CUs, RACH slot allocation information;

transmitting, to the CC, supportive data comprising the received load measurement information, the received interference measurement information, the obtained RACH information, and the received RACH slot allocation information;

in response to the transmitted supportive data, receiving, from the CC, a second set of candidate RACH transmission occasions, wherein the second set of candidate RACH transmission occasions comprises a subset of the first set of candidate RACH transmission occasions and is determined by the CC based on the supportive data;

determining, from the second set of candidate RACH transmission occasions and based at least partly on the RACH information, the load measurements, the interference measurement information, and the RACH slot allocation information, a third set of candidate RACH transmission occasions for the at least one DU, wherein the third set of candidate RACH transmission occasions is within a physical RACH (PRACH) slot, and wherein determining the third set of candidate RACH transmission occasions further comprises selecting the third set of candidate RACH transmission occasions to be non-overlapping in time with RACH transmission occasions used by the one or more neighbor CUs;

transmitting, to the at least one DU, the third set of candidate RACH transmission occasions;

in response to the transmitted third set of candidate RACH transmission occasions, receiving, from the at least one DU, a message that defines a selected subset of RACH transmission occasions;

releasing, based on the selected subset of RACH transmission occasions, one or more unused RACH transmission occasions from the third set of candidate RACH transmission occasions;

transmitting, to the CC, the selected subset of RACH transmission occasions; and transmitting, to the at least one UE via a system information block-type-1 (SIB1) Radio Resource Control (RRC) message, a bit string indicating the selected subset of RACH transmission occasions, wherein the bit string comprises a plurality of bits, each bit of the plurality of bits corresponds to a unique preamble transmission start symbol within the PRACH slot, and wherein a value of each bit of the plurality of bits indicates an enabled state or a disabled state for the corresponding unique preamble transmission start symbol.

16. The non-transitory computer readable medium according to claim 15, comprising instructions for causing the apparatus to perform:

receiving, from the at least one UE, a random-access preamble on at least one RACH transmission occasion indicated by the selected subset of RACH transmission occasions.

17. The non-transitory computer readable medium according to claim 16, comprising instructions for causing the apparatus to perform:

requesting, from the one or more neighbor CUs, the RACH slot allocation information.

18. The non-transitory computer readable medium according to claim 17, comprising instructions for causing the apparatus to perform:

indicate, to the one or more neighbor CUs, the selected subset of RACH transmission occasions.

* * * * *